United States Patent
Laurent-Lund et al.

(10) Patent No.: US 7,317,853 B2
(45) Date of Patent: Jan. 8, 2008

(54) INTEGRATED OPTICS SPOT SIZE CONVERTER AND MANUFACTURING METHOD

(75) Inventors: Christian Laurent-Lund, Copenhagen (DK); Lars-Ulrik Aaen Andersen, Holte (DK)

(73) Assignee: IGNIS Technologies AS, Horten (NO)

( * ) Notice: Subject to any disclaimer, the term of this patent is extended or adjusted under 35 U.S.C. 154(b) by 0 days.

(21) Appl. No.: 10/568,803

(22) PCT Filed: Aug. 19, 2004

(86) PCT No.: PCT/DK2004/000555

§ 371 (c)(1),
(2), (4) Date: Feb. 21, 2006

(87) PCT Pub. No.: WO2005/017588

PCT Pub. Date: Feb. 24, 2005

(65) Prior Publication Data

US 2006/0204175 A1    Sep. 14, 2006

Related U.S. Application Data

(60) Provisional application No. 60/496,010, filed on Aug. 19, 2003.

(30) Foreign Application Priority Data

Aug. 19, 2003  (DK) ............................... 2003 01183

(51) Int. Cl.
*G02B 6/26* (2006.01)
(52) U.S. Cl. .................................... 385/43; 385/129
(58) Field of Classification Search ................ 385/14, 385/28, 43, 129
See application file for complete search history.

(56) References Cited

U.S. PATENT DOCUMENTS

| 5,078,516 A | * | 1/1992 | Kapon et al. ............... 385/129 |
| 6,044,192 A | | 3/2000 | Grant et al. ................ 385/129 |
| 6,108,481 A | | 8/2000 | Tohyama et al. ........... 385/131 |
| 6,181,860 B1 | | 1/2001 | Granestrand et al. | |

(Continued)

FOREIGN PATENT DOCUMENTS

EP    0 901 024 A2    3/1999

(Continued)

OTHER PUBLICATIONS

Levy, R.A., et al., "Reflow Mechanisms of Contact Vias in VLSI Processing", J. Electrochem Soc. Solid-State Science and Technology, vol. 133, No. 7, pp. 1417-1424, Jul. 1986.

(Continued)

*Primary Examiner*—Kevin S. Wood
(74) *Attorney, Agent, or Firm*—Jacobson Holman PLLC

(57) ABSTRACT

An optical component having a combination of optical waveguide elements for modifying the spot size of a mode of an electromagnetic field propagated by an optical waveguide element, the optical waveguide elements being formed on a substrate. The optical component further includes a first section having a first optical waveguide element, and a second section having at least two cooperating optical waveguide elements. The cooperating optical waveguide elements of the second section are configured to maintain optical coupling between the optical waveguide elements to ensure that at least one mode of the electromagnetic field is sustained by the at least two cooperating optical waveguide elements in cooperation.

32 Claims, 7 Drawing Sheets

U.S. PATENT DOCUMENTS

| | | | |
|---|---|---|---|
| 6,269,211 B1 | 7/2001 | Hatayama et al. | 385/129 |
| 6,684,011 B2* | 1/2004 | Jeong et al. | 385/43 |
| 7,050,681 B2* | 5/2006 | Blauvelt et al. | 385/50 |
| 7,079,727 B1* | 7/2006 | Little | 385/28 |
| 2002/0141682 A1* | 10/2002 | Ryu et al. | 385/14 |
| 2003/0044118 A1* | 3/2003 | Zhou et al. | 385/43 |
| 2003/0053756 A1* | 3/2003 | Lam et al. | 385/49 |
| 2003/0081898 A1 | 5/2003 | Tabuchi et al. | 385/37 |

FOREIGN PATENT DOCUMENTS

| | | |
|---|---|---|
| EP | 1 245 971 A2 | 10/2002 |
| JP | 61 072207 | 4/1986 |
| JP | 06 194536 | 7/1994 |
| WO | WO 02/29905 A1 | 4/2002 |
| WO | WO 03/062883 A2 | 7/2003 |
| WO | WO 03/102648 A2 | 12/2003 |
| WO | WO 2004/021057 A1 | 3/2004 |

OTHER PUBLICATIONS

Kawachi, M., "Silica Waveguides on Silicon and Their Application to Integrated-Optic Components", Optical and Quantum Electronics 22, pp. 391-416, 1990.

Laurent-Lund, C., et al. "PECVD Grown Multiple Core Planar Waveguides with Extremely Low Interface Reflections and Losses", IEEE Photonics Technology Letters, vol. 10, No. 10, pp. 1431-1433, Oct. 1998.

* cited by examiner

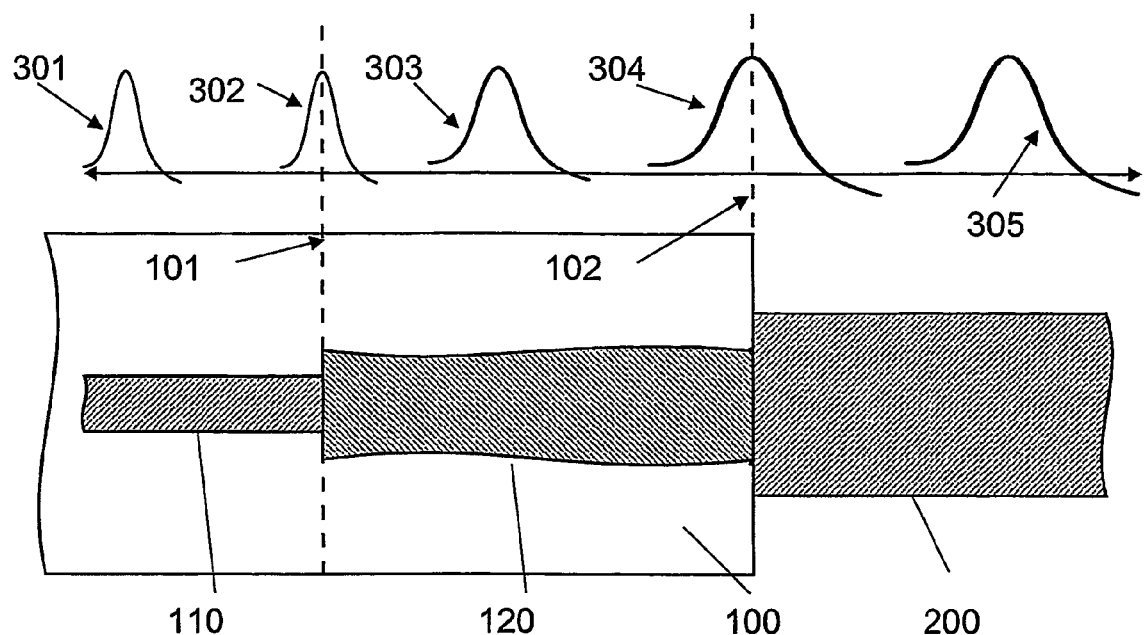
Fig. 1
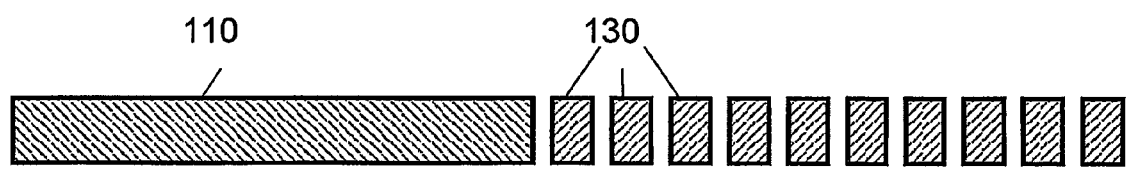
Fig. 2.a
Fig. 2.b

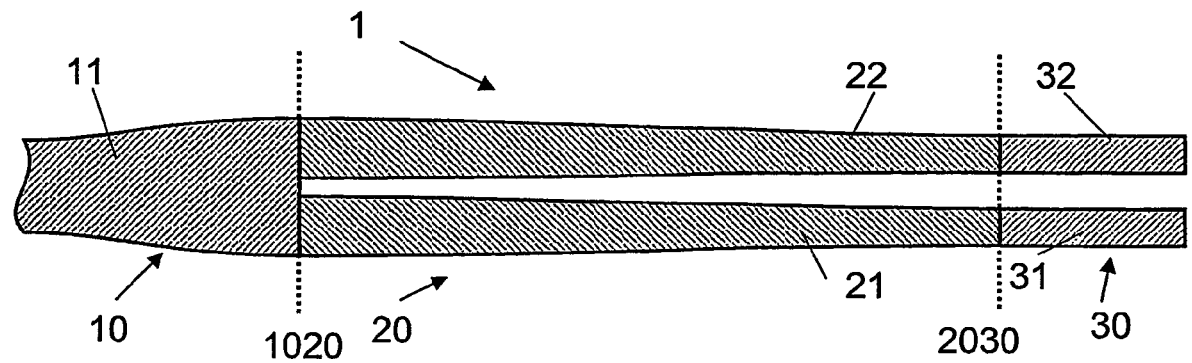
Fig. 3.a
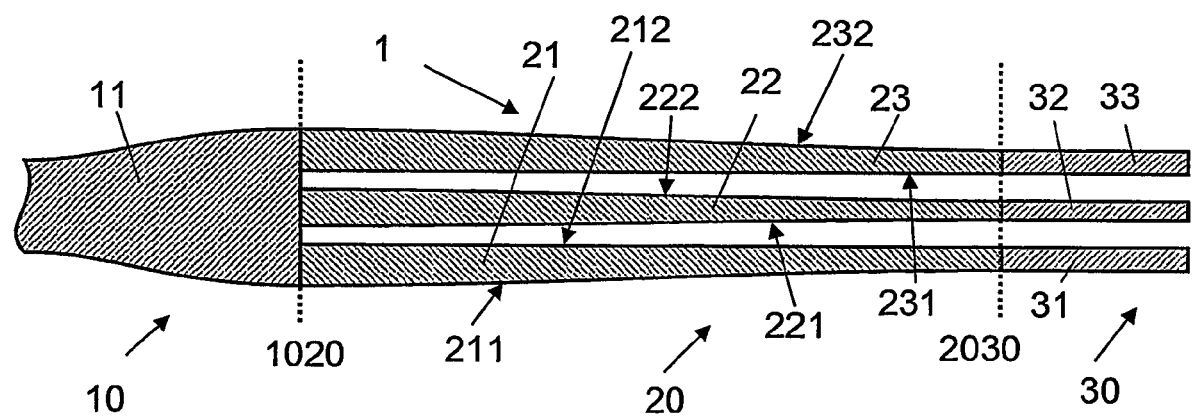
Fig. 3.b

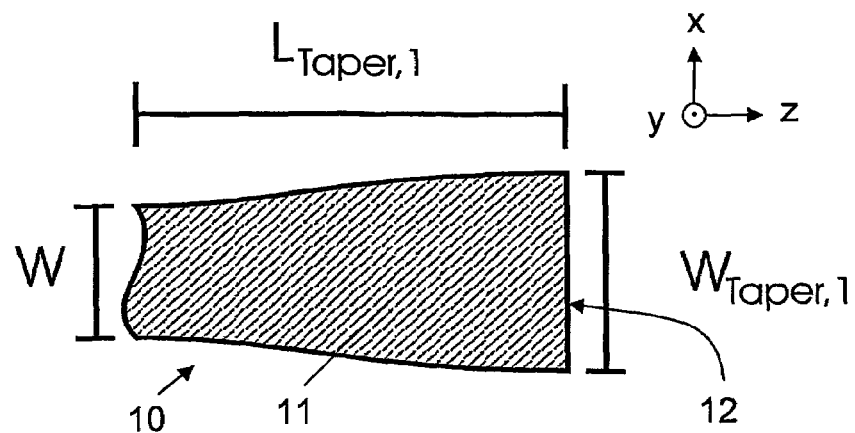
Fig. 4.a
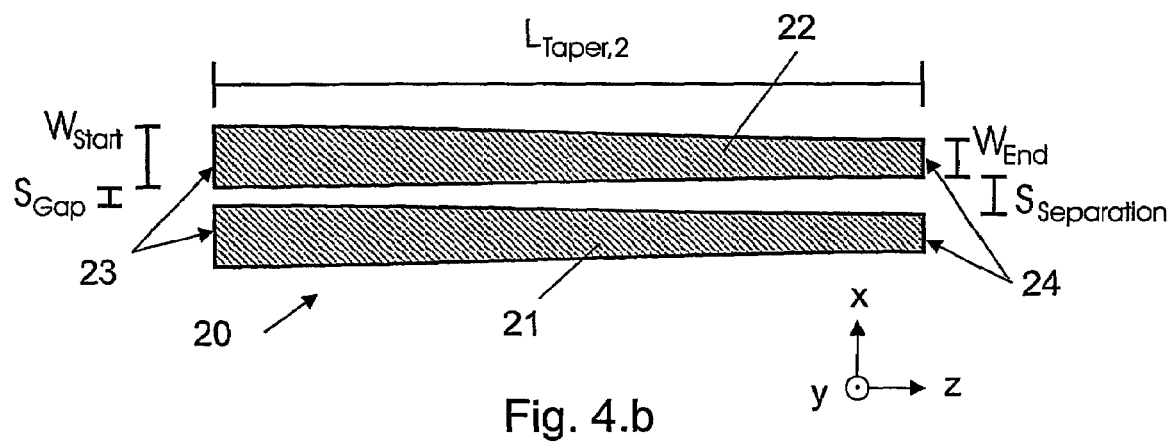
Fig. 4.b
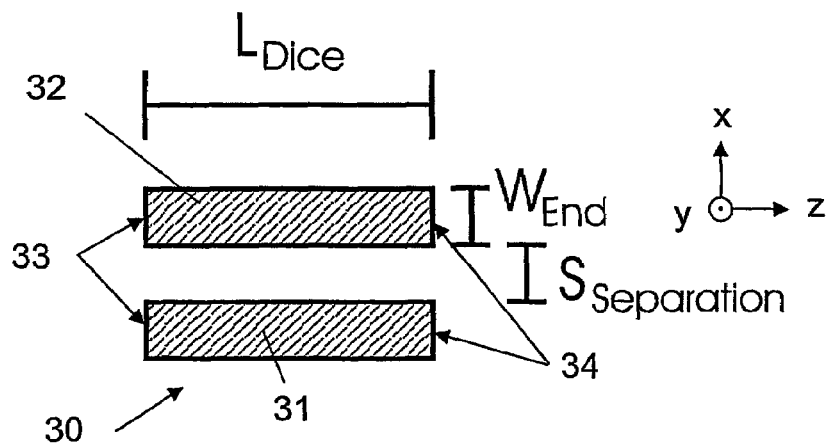
Fig. 4.c

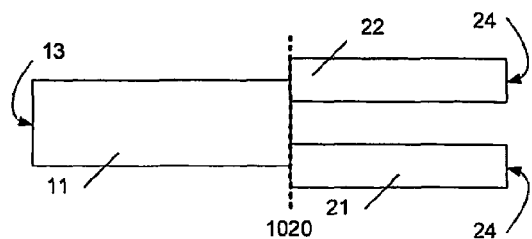
Fig. 8.a
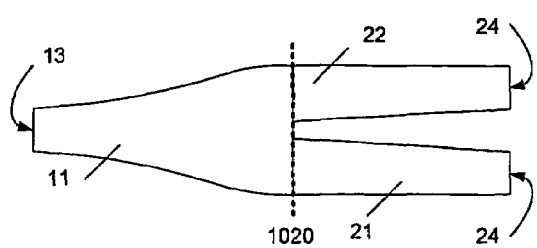
Fig. 8.e
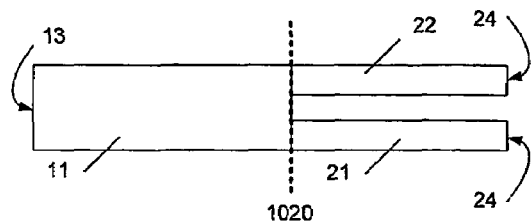
Fig. 8.b
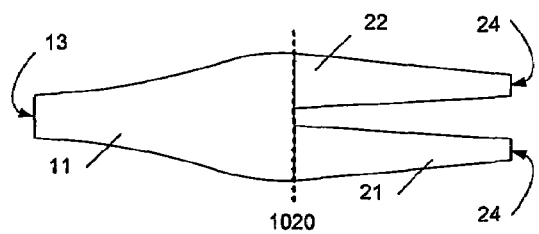
Fig. 8.f
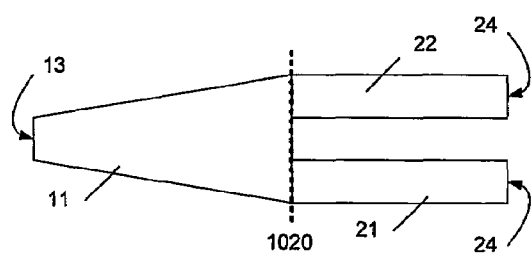
Fig. 8.c
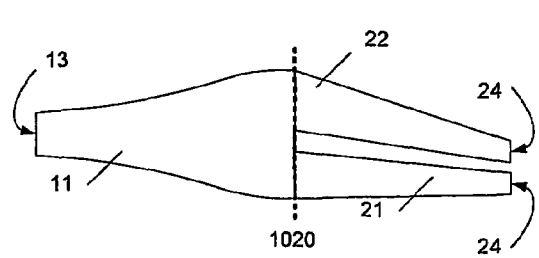
Fig. 8.g
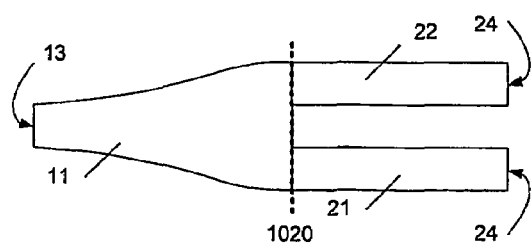
Fig. 8.d
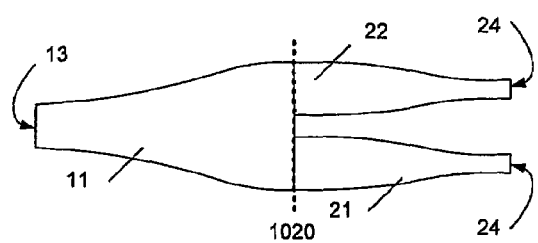
Fig. 8.h

INTEGRATED OPTICS SPOT SIZE CONVERTER AND MANUFACTURING METHOD

This is a nationalization of PCT/DK04/000555 filed 19 Aug. 2004 and published in English. This is also claiming the priority of Denmark application PA 2003 01183 filed 19 Aug. 2003 and U.S. Provisional Application No. 60/496,010 filed 19 Aug. 2003 under 35 U.S.C. §119.

TECHNICAL FIELD

The invention relates to an optical component comprising a combination of optical waveguide elements for modifying the spot size of a mode of an electromagnetic field propagated by an optical waveguide element, the optical waveguide elements being formed on a substrate The invention further relates to a method of manufacturing an optical component.

The invention may e.g. be useful in applications such as optical communication systems (e.g. systems employing WDM) where coupling of light between integrated optical circuits and optical fibres are needed.

BACKGROUND ART

Guided wave optical structures/circuits are typically optical fibres and planar integrated optical waveguides.

Optical waveguides may support from zero to several bound modes of the optical field depending upon parameters such as cross-sectional geometry, cross-sectional refractive index profile and wavelength. A (bound) mode is a stable state of the optical field, which is bound to the waveguide, having a substantial amount of the optical energy confined within the core of the waveguide. As a general rule, for a waveguide that supports a plurality of modes, the fundamental mode is better bound (confined) to the waveguide core than the first higher order mode, which in turn is better bound than the second higher order mode, etc.

For a waveguide that is symmetrical (both in geometry and refractive index profile) the modes that may be bound to the waveguides have alternating even and odd field profiles, where the even and odd field profiles are mutually orthogonal, meaning that optical energy cannot be transferred between an even and an odd field profile.

Within guided wave optics it is typically of interest to have the waveguide to be single-mode, as this eliminates problems with coupling of optical energy from the fundamental mode to higher order modes. The latter can be problematic in waveguide bends where symmetry breaks down and the field profiles no longer are orthogonal. As the higher order modes may be loosely bound to the waveguide core they may radiate the coupled optical energy out into the surroundings of the waveguide core leading to loss of the optical energy. The radiation loss of optical energy in the bends is obviously furthermore dependent upon the bend radius, where a smaller (larger) radius yields larger (smaller) radiation loss.

The obvious way to circumvent this problem is to have the bent waveguide to support only the fundamental mode (even though there will be bend loss for the fundamental mode also, however, it will be much smaller), or to have a large bend radius.

The criterion for a typical waveguide to be single mode is that the cross-section is sufficiently small or the refractive index contrast between the waveguide core and the surroundings is sufficiently small. However, the smaller the cross-section/refractive index contrast the smaller the confinement of the optical field to waveguide core will be, and the larger the bend loss for the fundamental mode will be.

By increasing the bend radius the physical size of the optical waveguide circuit (be it optical fibres or planar integrated optical waveguides) increases, taking up more volume which is undesirable.

Of the two parameters cross-section vs. index contrast, the latter is the more important for good confinement meaning that it is possible to have good confinement of the optical field to the waveguide core while maintaining single-mode operation by increasing the refractive index contrast and simultaneously reducing the waveguide core cross-section. Actually, it is possible to obtain strong confinement this way, and the stronger the confinement the smaller the radius can be of waveguide bends while maintaining low bend loss.

In order to integrate different optical functions/elements in an optical circuit in a limited space the different elements must be reduced in size as to fit into the limited space. This requires small bend radii, hence waveguide structures having small cross-sectional areas and large refractive index contrasts between the waveguide core and its surroundings.

In summary: It is advantageous to use waveguides having high refractive index contrast between the waveguide core and the surroundings, as well as small core cross-sections in order to fabricate small/narrow optical structures.

For a given waveguide supporting a mode with a field profile there exists a so-called spot size which basically is a measure of the size of the field profile, and is typically denoted by the Greek letter w. In case the field profile is not circular symmetric, a spot size for the vertical as well as the horizontal dimension are assigned to the field profile. When butt-coupling together two waveguides the requirement for loss less transfer of optical energy from the first to the second waveguide is that the overlap integral between the normalized field profiles pertaining to the two waveguides is unity, which means that the two field profiles must be identical, or in other words, that the spot sizes must be identical.

Assuming coupling between two waveguides having Gaussian field distributions with spot sizes $\omega_1$ and $\omega_2$, respectively, the coupling loss (CL) in dB can be calculated from the simplified expression $$CL = -20 * \log\left(\frac{2*\omega_1*\omega_2}{\omega_1^2+\omega_2^2}\right).$$

For an optical circuit applying high refractive index contrast waveguides with small cross-section the spot size is necessarily small if good confinement is achieved, see e.g. John M. Senior, "Optical Fiber Communications: principle and practice", Prentice Hall, (1985).

Optical integrated circuits are typically plugged into parts of optical fibre nets. Said nets are typically made using so-called standard fibre of which the most commonly used is the so-called SMF-28 fibre type. This kind of fibre is single mode and possesses excellent optical properties. However, it also has a relatively large spot size as it is a low refractive index contrast fibre. Hence, butt-coupling an optical waveguide circuitry made using high refractive index contrast to an SMF-28 fibre results in coupling loss—The larger the difference in spot sizes the larger the coupling loss.

For carefully tailored integrated waveguides where care has been put into design of core cross-section and refractive index difference, the coupling loss can be practically zero, whereas the coupling loss per facet for a 3 by 3 μm waveguide core, having a refractive index difference of 2.5% between core and surroundings, and an SMF-28 fibre is 3 dB, i.e., a loss of 6 dB just for connecting the waveguide circuit to the fibre net. For integrated optical circuits applying even lager refractive index differences this figure will increase, effectively disqualifying the circuits from practical use as these high loss values cannot be tolerated from a system point of view.

In summary: The problem of using integrated optical circuits with small cores and a high refractive index difference is that in coupling between said circuit and a standard fibre an intolerable high coupling loss is induced.

The solution to the aforementioned problem is to somehow shape the field profile in a section of the integrated optical circuitry just before the fibre coupling, such that the field profile from the integrated optical circuit resembles the field profile of the standard fibre, thereby reducing the coupling loss. Besides reducing the coupling loss, it must be assured that the polarization dependent loss in the coupling is maintained at a low level.

The technologies typically used for fabricating integrated optical circuits are planar, i.e., operates on planes in deposition, pattern definition and etching. This means that it is highly difficult to fabricate waveguides that varies in the vertical dimension, as the vertical dimension is defined by the thickness of the deposited core layer. It is, however, easy to vary the horizontal dimension as this can be included in the design.

Previous solutions to the problem include (periodically) segmented waveguides (cf. FIG. 2.a), where the waveguide has been segmented in such a way that the optical field is gradually lost in a manner that the field profile effectively expands thus providing better coupling to the fibre field. The basic flaw with this approach is that optical energy is actually "lost" in the spaces between the waveguide core segments, and no stable mode exists. This makes dicing and polishing precision highly critical, so that the spot size converter is terminated (attached to the fibre) just at the right position where the waveguide mode has evolved into fitting the fibre mode.

Another method uses a waveguide taper that gradually narrows the width of the waveguide (cf. FIG. 2.b). There exists an optimum width of a waveguide where the spot size of the field pertaining to the waveguide is a minimum. Increasing the width increases the spot size in the horizontal dimension while also increasing the confinement of the field. Decreasing the width also increases the spot size while decreasing the confinement of the field. If the waveguide is tapered down sufficiently, the spot size of the waveguide is increased in such a way that not only the horizontal but also the vertical dimension increases, providing good coupling to a standard fibre. However, when the waveguide core narrows the spot size becomes highly dependent upon the actual width, and since there are limited control over line widths in the fabrication process, it is difficult to reproducibly make good spot size converters this way—either the coupling is bad caused by too good confinement to the (too wide) waveguide core—or there is no optical energy to couple to the fibre since all is lost from the (too narrow) waveguide core. More ingenious solutions based on semiconductor materials and aimed at efficiently coupling a laser to an optical fibre have been proposed. EP-1 245 971 e.g. discloses a semiconductor waveguide component with a mode transition section where a tapered waveguide surrounded by two sets of lateral confinement waveguides along its tapered region and defined over a slab waveguide are provided, to reduce coupling loss to an optical fibre by matching the modal spots. WO-A1-02/29905 e.g. discloses an optical mode size converter for use between a semiconductor light source (e.g. a laser) and an optical transfer medium (e.g. an optical fibre) for receiving output light from the light source. The mode size converter comprises a lower waveguide formed on a buffer layer and an upper waveguide formed on a lower cladding layer located between the lower and upper waveguides, the upper waveguide having a branched light input unit.

A disadvantage of the latter solutions is that they require either a slab region under the waveguide or a lower and upper waveguide. They do therefore not apply to standard buried waveguide structures.

U.S. Pat. No. 6,181,860 discloses an optical waveguide with a transition portion at one end for enabling connection with an optical component (e.g. an optical fibre), the transition portion comprising a widening portion increasing in width leading to a tooth structure comprising teeth with a decreasing width.

WO-03/062883 discloses a high-index contrast waveguide coupler comprising a waveguide that is tapered down in width to an optical tip or alternatively to a combination of multiple tips.

DISCLOSURE OF INVENTION

Four criteria must be fulfilled in order to devise a good spot size converter.

Optical energy must not be lost in going from the input waveguide to the spot size converter.

Optical energy must not be lost in transforming the field profile.

The spot size of the input waveguide must be transformed smoothly and in a bound manner from the input waveguide to the output waveguide mode, such that the actual dicing/polishing position is of less importance.

The end field from the spot size converter must match the output waveguide profile.

Of the two previously discussed types of spot size converters (SSC's) (cf. FIG. 2), the tapered SSC yields the best results in simulations, as well as being the simpler of the two. However, as mentioned afore, this type of SSC is highly dependent upon the actual line width making it difficult to use in actual waveguide structures.

The problems of the prior art is that it is difficult to reproducibly provide a specific spot size or that more complicated structures—such as a slab region under the waveguide or a lower and upper waveguide—are required. Further, for the segmented waveguide solution there is high propagation loss.

The object of the present invention is to provide a mode coupler with low coupling loss that is easy to manufacture and process tolerant.

The objects of the invention are achieved by the invention described in the accompanying claims and as described in the following.

If instead of having one tapered waveguide, one uses a plurality of closely spaced tapered waveguides, the conglomerate of narrow waveguides work together in confining the field, while shaping the field so that good coupling is achieved.

An object of the invention is achieved according to the invention by an optical component comprising a combination of optical waveguide elements for modifying the spot size of a mode of an electromagnetic field propagated by an optical waveguide element, the optical waveguide elements being formed on a substrate, the optical component comprising a) a first section, comprising a first optical waveguide element adapted to sustain at least one mode of the electromagnetic field, b) a second section comprising at least two cooperating optical waveguide elements, each of said at least two cooperating optical waveguide elements comprising at least one waveguide segment, said at least two cooperating optical waveguide elements being optically connected to said first optical waveguide element of said first section; wherein said cooperating optical waveguide elements of said second section are adapted to maintain optical coupling between said optical waveguide elements to ensure that said at least one mode of the electromagnetic field is sustained by said at least two cooperating optical waveguide elements in cooperation.

An advantage of an optical component according to the invention is that it provides a mode size converter that is relatively simple to manufacture in that it requires no extra process steps. A further advantage is that it is readily suitable for integration with other optical circuitry on a common substrate. Further, It is applicable to a large range of refractive index contrast values.

In an embodiment of the invention, the at least two cooperating waveguide core elements are segmented (i.e. comprise two or more segments), each comprising a number of waveguide core pieces separated by a space filled with another material (e.g. upper cladding material).

In a preferred embodiment, each of the at least two cooperating waveguide core elements consist of one continuous length of core material (i.e. each consisting of only one core segment in the direction of light propagation).

In an embodiment, the first optical waveguide element of the first section is physically coupled to the at least two cooperating optical waveguide elements of the second section of the optical component, in other words, the two cooperating optical waveguide elements of the second section are branched off from the first optical waveguide element of the first section of the optical component (cf. e.g. FIG. 8). In a preferred embodiment, the core regions of the optical waveguide elements of the second section are implemented in the same physical layer and continue into the core region of the first optical waveguide element of the first section of the optical component. The core regions of the optical waveguide elements of the second section are preferably directly (uninterruptedly) connected to the core region of the first optical waveguide element of the first section of the optical component.

In the present context the term 'a mode of the electromagnetic field', e.g. the 'fundamental mode' and 'higher order modes', refer to field solutions of Maxwell's equations for propagation of electromagnetic waves in a guiding system, in particular such solutions that fulfil the boundary conditions imposed by the waveguide in question. The fundamental mode is the mode having the lowest cut-off frequency for the waveguide configuration in question. The terms 'electromagnetic field' and 'light' are used interchangeably in the present context. Likewise, the terms 'mode field size' and 'spot size' are used interchangeably in the present context.

In the present context the term 'adapted to maintain optical coupling between said optical waveguide elements to ensure that said at least one mode of the electromagnetic field is sustained by said at least two cooperating optical waveguide elements in cooperation' is to be understood to cover any configuration of optical waveguide elements (including the number, length, widths and mutual distance as a function of length of the second section) that ensures that the electromagnetic mode sustained by the first optical waveguide element of the first section is supported by the cooperating optical waveguide elements of the second section to guide the mode in collaboration. Such configurations may e.g. be determined by simulation. An adequate method is e.g. the Beam Propagation Method (BPM), as e.g. implemented in the OlympIOs design, simulation and mask layout software package from C2V, Enschede, The Netherlands. The actual simulation of a given layout optimized for a given technology (refractive indices and distribution) further depends on waveguide dimensions (width, thickness, mutual centre-to-centre distance, section length), form of waveguide (tapering-curve path), etc. It should be noted that since the electromagnetic mode is supported by the cooperating optical waveguide elements of the second section in collaboration, the two cooperating waveguide elements do not have to sustain single-mode operation individually.

In an embodiment of the invention, the electromagnetic mode propagated by the first optical waveguide element of the first section is supported by and distributed between the cooperating optical waveguide elements of the second section.

In an embodiment of the invention, the widths $w_{2,i}$ of and mutual distances $s_{2,i,i+1}$—where i=1, 2, . . . —between said cooperating waveguide elements of said second section are adapted to maintain optical coupling between said waveguide elements to ensure that said at least one mode of the electromagnetic field is sustained by said at least two cooperating waveguide elements in cooperation.

In an embodiment of the invention, the substrate defining a reference plane, the optical waveguide elements having width dimensions defined in the reference plane and in a cross section of the optical waveguide elements perpendicular to the intended direction of propagation of the electromagnetic field of the optical waveguide elements, the first optical waveguide element of the first section having a width $w_1$ is tapered so that its width $w_1$ increases towards its connection to the cooperating optical waveguide elements of the second section. This has the advantage of adapting the width of the first and second sections, e.g. to comply with design rules for minimum mutual distance between core patterns. In some cases, a reduced loss may further be achieved because a tapering as indicated will broaden the field at the interface to the second section. This reduces the field intensity in the central part where a gap between two narrow waveguides may be situated, thereby reducing the optical loss when crossing the interface between the first and the second section.

In the present context, the indicated dimensions are in general dependent on the position along the optical waveguide elements in question (i.e. dependent on a coordinate along the direction of intended propagation of the electromagnetic field, indicated by 'z' in FIG. 4). Examples of such dimensions are $w_1$, $w_{2,i}$, $s_{2,i,i+1}$, $w_{3,i}$, where the first index, e.g. '2' in $w_{2,i}$, is meant to indicate the section number, here '2', and 'i' an integer for differentiating the N different waveguides in the section, i=1, 2, . . . , N for width dimensions (e.g. $w_{3,i}$) and i=1, 2, . . . , N−1 for mutual distance dimensions (e.g. $s_{2,i,i+1}$), where N≧2 in sections 2 and 3).

The width and height of a waveguide element is in the present context taken in a transversal cross section of the waveguide core (i.e. in a cross section perpendicular to the intended direction of light guidance of said waveguide core elements at the location of a width measurement), the width being a dimension of the core region of the waveguide element in question in a direction parallel to a reference plane defined by the opposing, substantially planar, surfaces of the substrate x-direction in FIG. 10), the height being a dimension of the core region of the waveguide element in question in a direction perpendicular to the reference plane (in a direction of growth, y-direction in FIG. 10). The width of a ridge (e.g. a waveguide) is generally taken as the largest width-dimension in the cross section in question (e.g.—but not necessarily—at the bottom of the ridge closest to the supporting layer). The width of a groove (e.g. the distance between waveguide core sections) is generally taken as the smallest dimension in the cross section in question (e.g. at the bottom of the ridge closest to the supporting layer).

In an embodiment of the invention, the width of a waveguide core element is taken as the dimension defined by the corresponding mask used for generating the structure in question in the processing step forming the physical layout of the waveguide core element and possible additional structures (e.g. transversal elements).

In general, the tapering should preferably be smooth and contain no discontinuities (sudden changes) in the width of the optical waveguide element.

In an embodiment of the invention, the tapering of the first optical waveguide element of the first section is arranged by at least one of the edges of the waveguide element in a direction substantially parallel to the direction of propagation of the electromagnetic field of the first optical waveguide element being defined by a generating curve essentially following a cosine path or an $n^{th}$ order polynomial path, such as a linear path or a $5^{th}$ or a $7^{th}$ order polynomial path. In an embodiment, both edges of the waveguide element of the first section are defined by a generating curve essentially following a cosine path or an $n^{th}$ order polynomial path, such as a linear path or a $5^{th}$ or a $7^{th}$ order polynomial path. In an embodiment, the edges are defined by the same generating curve. In an embodiment, the edges are defined by different generating curves. In an embodiment, the tapering of the waveguide is defined by a generating curve following a cosine path or an $n^{th}$ order polynomial path, such as a linear path or a $5^{th}$ or a $7^{th}$ order polynomial path. This has the advantage of providing a low loss in the widening of the electromagnetic field so that there is no discontinuity in the waveguide width, the waveguide angle or the radii of curvature of the first optical waveguide element of the first section. This is a prerequisite for adiabatic propagation of the field from the input end to the output end of the first waveguide element of the first section.

The term 'the tapering of the waveguide is defined by a generating curve following a specific curve path' is in the present context taken to mean that the centreline of the waveguide and/or the edges of the waveguide is/are defined by a specific curve path. For example, in an embodiment, both edges of a waveguide element may be defined by an n'th order polynomial (possibly of different order). In another embodiment the centre line of the waveguide is defined by a cosine path, whereas the edges are defined by a linear path superposed by a cosine path (leading to a linear increase in width of the waveguide).

In an embodiment of the invention, the at least two cooperating optical waveguide elements of the second section have mutual edge to edge core distances $s_{2,i,i+1}$, and the edge to edge core distance $s_{2,i,i+1}$ between adjacent of the at least two cooperating optical waveguide elements of the second section decrease towards their connection to the first optical waveguide element of the first section. This has the advantage of providing a means for shaping the mode field.

In an embodiment of the invention, the cooperating optical waveguide elements of the second section—having core widths $w_{2,i}$—are tapered so that their widths $w_{2,i}$ increase towards their connection to the first optical waveguide element of the first section. This has the advantage of providing a further means for shaping the mode field and reducing the loss.

In an embodiment of the invention, the individual cooperating optical waveguide elements are symmetrical about a longitudinal axis (i.e. an axis in a direction of the intended light propagation). This has the advantage of facilitating a symmetrical spot size. Alternatively, the individual cooperating optical waveguide elements may be non-symmetrical, e.g. the edges of the waveguide core element in a longitudinal direction being represented by different curves (e.g. one being linear, the other cosine, etc.). This may be useful when the mode field size is to be formed in a non-circular (e.g. asymmetric) manner, to match a particular waveguide form or to direct the light into a particular part of the end facet of a waveguide.

In an embodiment of the invention, the individual cooperating optical waveguide elements are identical in geometrical form and width. This is an advantage when the resulting spot size is to be symmetrical. Alternatively, the individual cooperating optical waveguide elements may be geometrically different and/or have different widths.

In an embodiment of the invention, the tapering of the cooperating optical waveguide elements of the second section is arranged by at least one of the edges of the waveguide elements in a direction substantially parallel to the direction of propagation of the electromagnetic field of the first optical waveguide element being defined by a generating curve essentially following a cosine path or an $n^{th}$ order polynomial path, such as a linear path or a $5^{th}$ or $7^{th}$ order polynomial path. In an embodiment, both edges of at least one of the cooperating waveguide elements of the second section are defined by a generating curve essentially following a cosine path or an $n^{th}$ order polynomial path, such as a linear path or a $5^{th}$ or a $7^{th}$ order polynomial path. In an embodiment, the edges are defined by the same generating curve. In an embodiment, the edges are defined by different generating curves. In an embodiment, the tapering of at least one of the cooperating waveguides is defined by a generating curve following a cosine path or an $n^{th}$ order polynomial path, such as a linear path or a $5^{th}$ or a $7^{th}$ order polynomial path. This has the advantage of providing a low loss (adiabatic) tapering, cf. also the advantages of the tapering of the first section.

In an embodiment of the invention, the generating curve for one or both edges of a cooperating waveguide element of section two (or of the first waveguide element of section one) may be defined by a cosine function.

In an embodiment of the invention, the edge to edge distance between neighbouring cooperating waveguide core elements is the same for all optical waveguide elements of the second section (in a given cross section of the section, i.e. for a given longitudinal coordinate (cf. 'z' in FIG. 4.b)), i.e. $s_{2,1,2} = s_{2,2,3}$, etc.

In an embodiment of the invention, the number of cooperating optical waveguide elements of the second section is two. This has the advantage of providing a simple and efficient configuration that takes up a minimum of space on the substrate of an integrated optical component. The latter is of special importance in cases where several mode converters are to be integrated on the same chip (e.g. for WDM-applications) or in cases where the mode size converter is to be integrated with many other functions on the same chip.

In other embodiments of the invention, the number of cooperating optical waveguide elements of the second section is larger than two, such as three, such as four. This has the advantage of providing a design flexibility to customize the spot size to predefined specifications in view of predefined technology, refractive indices and index-differences, design rules for core and cladding features (layer heights, minimum feature widths, minimum feature separations, etc.), etc.

In an embodiment of the invention, the width $w_1$ of the first optical waveguide element of the first section is larger than or equal to the sum of widths $w_{2,i}$ of the cooperating optical waveguide elements of the second section at their mutual connection. In an embodiment of the invention, neighbouring cooperating optical waveguide elements together form a fork or Y-type structure, i.e. the opposing edges of neighbouring waveguide core elements meet at their joint or connection with the first waveguide core element of the first section. The actual minimum edge to edge difference between the cooperating optical waveguide elements is determined by the design rules for the technology in question. In an embodiment of the invention, a minimum edge to edge distance separates neighbouring cooperating optical waveguide elements at their connection to the first waveguide core element of the first section. In an embodiment of the invention, the minimum distance is chosen with a view to the design rules for the process. This has the advantage of making the component more reproducible thereby improving reliability, increasing process yield and decreasing cost.

In an embodiment of the invention, the at least two cooperating optical waveguide elements of the second section are adapted to be optically coupled to an output optical waveguide. In an embodiment of the invention, the output optical waveguide is formed on the substrate, thereby providing an 'on board' spot size converter on an integrated optical chip.

In an embodiment of the invention, the optical component further comprising c) a third section comprising at least two dicing optical waveguide elements having core widths $w_{3,i}$, the at least two dicing optical waveguide elements being optically connected to the at least two cooperating optical waveguide elements of the second section. This has the advantage of facilitating the handling of the optical component, including the sawing of the chip and the polishing of the end faces of the waveguides (e.g. the dicing waveguide facet that are to interface to an external waveguide, e.g. an optical fibre).

In an embodiment, the at least two dicing optical waveguide elements of the third section is physically coupled to the corresponding at least two cooperating optical waveguide elements of the second section of the optical component, in other words (cf. e.g. FIG. 3). In an embodiment, the core regions of the at least two dicing optical waveguide elements of the third section are directly (uninterruptedly) connected to the core regions of the corresponding least two cooperating optical waveguide elements of the second section of the optical component.

In an embodiment of the invention, the widths $w_{2,i}$ of the at least two cooperating waveguides of the second section essentially equals the widths $w_{3,i}$, where i=1, 2, . . . , of the at least two dicing optical waveguide elements of the third section at their mutual connection. In a preferred embodiment, corresponding waveguides (i.e. having same index i) of sections 2 and 3 have identical widths, i.e. $w_{2,1}=w_{3,1}$, $w_{2,2}=w_{3,2}$, etc. In a preferred embodiment, corresponding waveguides of sections 2 and 3 are aligned, whereby a minimum loss configuration is provided. In an embodiment of the invention, the at least two dicing optical waveguide elements are essentially straight and parallel. In an embodiment of the invention, the widths $w_{3,i}$ of the at least two dicing optical waveguide elements of the third section remain essentially constant. In an embodiment of the invention, each of the at least two dicing optical waveguide elements of the third section are identical in geometrical form and width. Alternatively, the dicing optical waveguide elements may have different widths, e.g. conforming to the widths of the corresponding waveguides of section 2 of the component.

In an embodiment of the invention, the at least two dicing optical waveguide elements of the third section are adapted to be optically coupled to an output optical waveguide. In an embodiment of the invention, the output optical waveguide is an optical fibre, such as a single mode fibre, e.g. an SMF-28 type optical fibre thereby providing a coupling that adapts the spot size of a planar integrated optical circuit to that of a standard single mode optical fibre, which is useful in many optical communications systems.

In an embodiment of the invention, the first optical waveguide element of the first section is adapted to be optically coupled to an input optical waveguide, the input optical waveguide having a width $w_{in}$ which is essentially equal to the width $w_1$ of the first optical waveguide element at their mutual connection. In an embodiment of the invention, the input optical waveguide is formed on the substrate. This provides a smooth and low loss connection to an optical waveguide integrated with the component on the same chip (in practice, no interface need to be established, the input waveguide may be made continuously with the first waveguide of the first section of the component). Alternatively, the input waveguide may be an optical fibre whereby an optical component according to the invention may be used as a spot size converter between optical fibres of different specifications. Alternatively, two components according to the invention may be arranged 'back to back' on the same chip to have their first sections mutually connected by an on-chip optical waveguide, thus adapting the respective third sections of the components to the spot sizes of the relevant optical fibres.

In an embodiment of the invention, the width $w_{in}$ of the input optical waveguide is less than the width $w_1$ of the first optical waveguide element at their mutual connection, such as in the range 0.5 to 0.9 times $w_{in}$.

In an embodiment of the invention, the combination of optical waveguide elements comprises a base layer formed on the substrate, the base layer having a refractive index $n_{base}$, a waveguide defining core pattern of a core material formed on the base layer, the core material having a refractive index $n_{core}$, an upper cladding layer covering the core pattern and the base layer, the upper cladding layer having a refractive index $n_{uclad}$. In an embodiment of the invention, the refractive index of the base layer is substantially equal to that of the upper cladding layer.

In embodiments of the invention, the index contrast $\Delta n$ between core and cladding and/or core and base layers $(n_{core}-n_{uclad})/n_{core}$, $(n_{core}-n_{base})/n_{core}$, respectively, is larger than 0.5%, such as larger than 1%, such as larger than 2%, such as larger than 5%, such as larger than 10%, such as larger than 20%, such as larger than 30%. In an embodiment of the invention, the index contrast between core and cladding and/or core and base layers is in the range between 0.5% and 10%, such as between 0.5% and 5%, such as between 0.5% and 3%.

In an embodiment of the invention, $n_{core}$ is 1.4816 (SiON), and $n_{uclad}=n_{base}=1.4450$ (SiO$_2$) yielding an index contrast $\Delta n$ of 2.5%.

In an embodiment of the invention, at least one transversal waveguide core element is arranged between the at least two cooperating optical waveguide elements of the second section. In an embodiment of the invention, at least one transversal waveguide core element is arranged between the at least two dicing optical waveguide elements of the third section. This has the advantage of helping in reducing the transition loss, and facilitating the flow of the cladding glass during fabrication, the transversal elements thus preventing the formation of keyholes between adjacent waveguides in the second and/or third sections of the component.

In an embodiment of the invention, a multitude of M transversal waveguide core elements each having a width $w_{t,j}$, where j=1, 2, ..., M, and forming paths with a mutual centre to centre distance of $s_{t,j,j+1}$, where j=1, 2, ..., M−1, j=1 corresponding to the transversal element located closest to the first section and j=M corresponding to the transversal element located farthest from the first section.

In an embodiment of the invention, the widths $w_{t,j}$ decrease with increasing j and/or the centre to centre distances of $s_{t,j,j+1}$ increase with increasing j. Both features have the effect of gradually adjusting the effective refractive index of the region between two waveguide core elements to that of the upper cladding.

The above mentioned effective refractive index is defined in the following: Instead of considering the true waveguide structure with core and cladding the light propagation can for most situations easily be described with great accuracy as a plane wave propagating in a homogeneous medium having a refractive index $n_{eff}$, the so-called effective refractive index. This effective index stems from eigenvalue equations originating from Maxwell's equations. The effective index of a bound mode is greater than the cladding refractive index, and lower than the core refractive index. The effective index is furthermore a function of the waveguide core cross-sectional geometry. See e.g. H. Nishihara et al. "Optical Integrated Circuits", McGraw-Hill (1989).

In an embodiment of the invention, the optical component is adapted to propagate light in a range around a specific wavelength $\lambda$. In an embodiment of the invention, the optical component is optimized to wavelengths $\lambda$ in the range 190 nm to 11 µm, such as in the range of 250 nm to 3.6 µm, such as in the range of 850 nm to 1800 nm, such as in the range of 1300 nm to 1600 nm, such as around 1550 nm.

The invention may be implemented in any technology appropriate for providing waveguides for propagation of light. In an embodiment of the invention, the core material comprises a material from the group GaAs, InP, SiON, Silicon, polymers, sol-gel glasses, LiNbO$_3$.

A method of manufacturing an optical component according the invention is furthermore provided, the method comprising the steps of
a) providing a substrate,
b) forming a lower cladding layer on the substrate,
c) forming a core layer on the lower cladding layer,
d) providing a core mask comprising a core region pattern corresponding to the layout of the core regions of optical waveguide elements of the component,
e) forming core regions using the core mask, a photolithographic and an etching process, and
f) forming an upper cladding layer to cover the core region pattern and the lower cladding layer.

An optical component according to the invention is thus provided with no extra processing steps as compared to a normal process for forming optical waveguides on a substrate.

In an embodiment of the invention the core mask further comprises transversal waveguide core elements located between neighbouring optical waveguide elements. This has the advantage that the loss reducing and flow improving effects of the transversal elements may be achieved with no extra processing steps.

In an embodiment of the invention, the method further comprising the steps of
g) cutting the dicing waveguides of the third section of the components,
h) dicing/polishing the end facets the dicing waveguides.

These steps provide the separation of the chip on which the optical component is included from the rest of the substrate (which preferably is a part of a wafer holding a number of (optionally) identical integrated optical circuits) (step g)) and improve the coupling of the component to an external waveguide, e.g. an optical fibre (step h)).

In an embodiment, the method in step d) further comprising the sub-step of d1) providing that the tapering of the core region of said first waveguide element of said first section and/or at least one of said cooperating optical waveguide elements of said second section of said optical component is/are defined by a generating curve essentially following a cosine path or an $n^{th}$ order polynomial path, such as a linear path or a $5^{th}$ or a $7^{th}$ order polynomial path. This has the advantage of providing a low loss (adiabatic) tapering, cf. also the advantages of the corresponding device (tapering of the first and second sections of an optical component according to the invention).

In an embodiment of the invention, the substrate is a silicon substrate, the base and cladding layers comprise silica based oxides and the core layer comprises silicon-oxy-nitride. Alternatively, the core layer may e.g. comprise Ge- or Ti- or P-doped silica.

In an embodiment of the invention, the formation of layers on the substrate is made by plasma enhanced chemical vapour deposition (PECVD).

An optical component according to the invention may alternatively be fabricated by Flame Hydrolysis Deposition (FHD), Atmospheric Pressure Chemical Vapor Deposition (APCVD), Low-Pressure Chemical Vapor Deposition (LPCVD), sol-gel glasses or Laser Reactive Deposition (LPD™).

It should be emphasized that the term "comprises/comprising" when used in this specification is taken to specify the presence of stated features, integers, steps or components but does not preclude the presence or addition of one or more other stated features, integers, steps, components or groups thereof.

BRIEF DESCRIPTION OF DRAWINGS

The invention will be explained more fully below in connection with a preferred embodiment and with reference to the drawings in which:

FIG. 1 shows the basic principle of a spot size converter for converting the mode field size between a planar waveguide and an optical fibre, FIG. 2 shows two prior art spot size converters (SSC), FIG. 2.a an SSC based on a periodically segmented waveguide, and FIG. 2.b an SSC based on a tapered waveguide, FIG. 3 shows embodiments of the layout of spot size converters according to the invention, the embodiment in FIG. 3.a comprising two cooperating waveguide elements in the second section, and the embodiment in FIG. 3.b comprising three cooperating waveguide elements in the second section, FIG. 4 shows three sections of an embodiment of a spot size converter according to the invention, FIG. 4.a illustrating the first section, FIG. 4.b the second and FIG. 4.c the third section, FIG. 8 shows various embodiments of spot size converters according to the invention.

Figure 5:
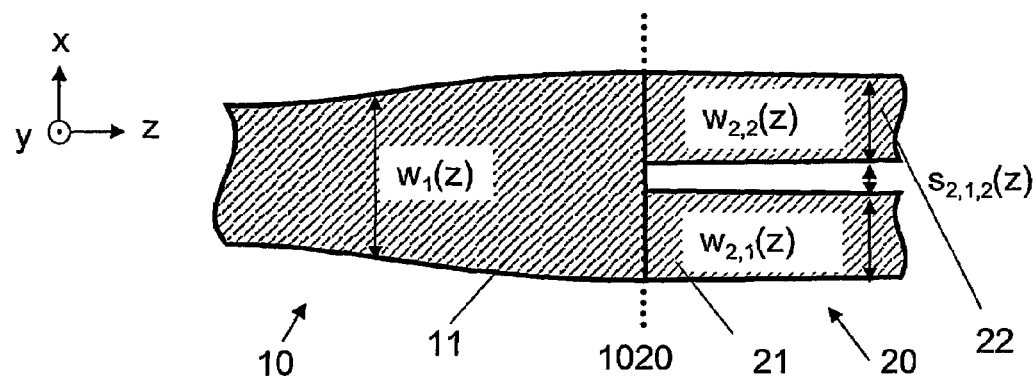
FIG. 5 shows details of the connection of the first and second sections of an embodiment of a spot size converter according to the invention.

The figures are schematic and simplified for clarity, and they just show details which are essential to the understanding of the invention, while other details are left out.

MODE(S) FOR CARRYING OUT THE INVENTION

FIG. 1 shows the basic principle of a spot size converter for converting the mode field size between different waveguides, exemplified by a planar waveguide 110 forming part of an integrated optical an optical circuit 100 and an optical fibre 200.

The central planar waveguide section 120 is made in such way that it transforms the field profile 301 from the narrow high refractive index core waveguide 110 into the profile 305 of the wide low refractive index core fibre/waveguide 200. Also shown in FIG. 1 are intermediate field profiles 302, 303 and 304 at, respectively, the interface 101 between planar waveguide 110 and the intermediate planar waveguide 120, in the intermediate planar waveguide 120 and at the interface 102 between the intermediate planar waveguide 120 and the optical fibre 200. Due to reciprocity, the spot size converter also works the opposite way from fibre 200 to planar waveguide 110.

FIG. 2 shows two well-known types of spot size converters (SSC). FIG. 2.a shows a so-called periodically segmented waveguide (PSW) SSC having a section comprising a continuous, constant width waveguide 110 and a section comprising a segmented waveguide in the form of individual pieces of waveguide core material 130 separated by material of lower refractive index. FIG. 2.b shows a so-called tapered SSC comprising a continuous, constant width waveguide 110 and a tapered waveguide 140 narrowing the width of the constant width waveguide 110.

The layout of an embodiment of a spot size converter 1 according to the invention with two arms is shown in FIG. 3.a.

The SSC of FIG. 3 comprises three sections 10, 20, 30: A first section 10 comprising a first optical waveguide element 11 that tapers up the original narrow waveguide to a greater width at the optical connection interface 1020 with the second section 20. In an embodiment, the optical connection interface 1020 is taken to be the plane perpendicular to the centreline of the first section (the centreline being essentially parallel to the direction of propagation of light of the waveguide element) and through a point where at least one of the cooperating optical waveguides 21, 22 of the second section 20 branches off (e.g. is identifiable as a separate entity) from the first optical waveguide element 11 of the first section 10. The second section 20 contains two closely spaced cooperating optical waveguide elements 21, 22 that are gradually tapered down to a final width at the optical connection interface 2030 with the third (optional) section 30. The final (third) section 30 is a continuation of the second section 20 comprising two closely spaced dicing optical waveguide elements 31, 32, in the form of straight waveguides sections.

By choosing the tapering of the waveguides of section two appropriately, the third section may be omitted by having an essentially straight part of the waveguides near the end distal to the interface 1020 between the first and second sections. The advantage of having a third section is in the handling of the integrated optical circuit during sawing and polishing. Further, if e.g. the waveguide to which light is to be coupled from the cooperating optical waveguide elements of the second section is another planar waveguide formed on the same substrate as the optical waveguide elements of the spot size converter, the third section is not needed.

FIG. 3.b shows an embodiment of a spot size converter according to the invention comprising three cooperating waveguide elements 21, 22, 23 in the second section and correspondingly three dicing waveguide elements 31, 32, 33 in the third section of the waveguide aligned with and having the same width as the corresponding waveguide elements of the second section, the dicing waveguide elements being of a constant width over the length of the third section. In the embodiment shown in FIG. 3.b, the outer edges 211, 232 of the two outer cooperating waveguide elements 21, 23 follow a tapered cosine function, whereas the inner edges 212, 231 are linear, and the edges 221, 222 of the centre waveguide element 22 follow a $7^{th}$ order polynomial path.

In the following this idea will be described with reference to FIG. 4 for the case where two closely spaced tapered narrow waveguides are used to transform the optical field.

A preferred embodiment of a spot size converter according to the invention comprises three sections (10, 20, 30 as shown in FIG. 3). A first taper section 10 that shapes the optical field before entering the second section 20 comprising two (or a plurality) of narrow waveguides, and finally a third section 30 used for dicing/polishing.

The first section 10 comprising a tapered first optical waveguide element 11 is shown in the FIG. 4.a.

The tapering of the first optical waveguide element 11 of section one may be present for several reasons, including that the fabrication process demands a certain minimum gap size (cf. $S_{Gap}$ in FIG. 4.b) between the narrow cooperating waveguides (21, 22 in FIG. 4.b) in section two or that the one 'incoming' and (at least) two 'outgoing' cooperating optical waveguide elements are of the same width (e.g. minimum width according to the design rules) or that the width ($w_{Start}$ in FIG. 4.b) of the (at least) two 'outgoing' cooperating optical waveguide elements (21, 22 on FIG. 4.b) are larger than half the width (W in FIG. 4.a) of the one 'incoming' waveguide.

The role of the first taper is to broaden the field. This reduces the field intensity in the central part where the gap between the two narrow waveguides is situated, hence reducing the optical loss when crossing the interface between the first and the second section. Furthermore, the broadening makes it possible to have a relatively large start width of the narrow arms, further reducing the transition loss going from section one to section two. The actual functional shape of the taper should be chosen such that the shape of the modal field is changed adiabatically, i.e. smoothly without discontinuities, e.g. as represented by a $7^{th}$ order polynomial or a cosine function.

A taper can basically be described by three parts, being
The defining line—$f_d(z)$
The upper side—$f_u(z)$
The lower side—$f_l(z)$ The defining line describes the functional dependence of the taper—Typically tapers are linear, i.e., the defining line is a straight line. However, every other imaginable function may be applied, such as e.g. a polynomial function or trigonometric functions.

The upper (lower) side function describes the orthogonal distance from the defining line to the upper (lower) side of the waveguide taper.

The difference between the upper and lower side is the width of the taper $$W(z)=f_u(z)-f_l(z).$$

Given that $$|f_u(z)|=|f_l(z)|$$

the upper and lower sides are symmetrically placed around the defining line, which then is identical to the centre line of the waveguide taper.

The typical taper width variation is linear, i.e., $$f_d(z)-f_{u,l}(z)=a+b*z$$

where a and b are two constants. However, every imaginable function can be applied on the right hand side of the equals sign.

Of tapers typically used (but not limited to) for the spot size converters are tapers where $$f_d(z)=\text{Const.}$$

and $$f_u(z)=-f_l(z)=a_0+a_1z+a_2z^2+\ldots+a_7z^7$$

which is designated a 7'th degree polynomial taper. Another taper typically used is one where $$f_d(z) = a*\cos(b*z)$$

$$f_u(z) = -f_z(z) = \frac{W_{Start}}{2} + \frac{W_{End} - W_{Start}}{2}z$$

which is designated a cosine taper.

The first taper 11 is characterized by a first width $w_1=W$ which may be the standard width of a narrow high refractive index core waveguide (cf. e.g. 150 on FIG. 9), an end width $w_1=W_{Taper,1}$ of the cross section 12 of the first optical waveguide element 11 at the interface to the second section and a taper length $L_{Taper,1}$ over which the optical waveguide element is widened from W to $W_{Taper,1}$. An xyz coordinate system is indicated, where x is the direction of the width of the waveguide, y the direction of the height of the waveguide (see also FIG. 10) and z the direction of light propagation of the optical waveguide element.

The second section 20 is shown in the FIG. 4.b.

The second section comprises two (or a plurality) of axially parallel tapered cooperating optical waveguide elements 21, 22. These waveguides are characterized by a first width $w_{2,i}=W_{Start}$, an end width $w_{2,i}=W_{End}$, and a length $L_{Taper,2}$, as well as a separation between the ends $s_{2,i,i+1}=S_{Separation}$, and a separation between tapers at the beginning $s_{2,i,i+1}=S_{Gap}$. The actual functional shape of the taper should be chosen such that the shape of the modal field is changed adiabatically, i.e. smoothly without discontinuities, e.g. as represented by a $7^{th}$ order polynomial or a cosine function.

The third section 30 is shown in the FIG. 4.c.

The third section 30 is a continuation of the second section 20, however, the dicing optical waveguide elements 31, 32 are straight sections. This third section is intended as a dice/polish section or as a transport waveguide for a larger-size mode.

If the tapered waveguides in section two are chosen properly, there will be a negligible transition loss going from section two to section three. Furthermore, the optical field should be stable, thus relaxing the precision with which the dicing/polishing must be performed, ultimately increasing performance/yield.

The third section is characterized by the same waveguide width $w_{3,i}=W_{End}$ and separation $s_{3,i,i+1}=S_{Separation}$ as for section two at the end, as well as a length $L_{Dice}$.

When crossing the interface (2030 in FIG. 3) between sections one 10 and two 20, the optical field experiences a non-adiabatic refractive index contrast profile discontinuity (because of the gap $S_{Gap}$ between adjacent cooperating optical waveguide elements 21, 22 on FIG. 4.b) which leads to loss of a part of the optical field.

The tapering of the first section helps in reducing the loss; however, there will still be a loss due the discontinuity. The transition loss can be further reduced by introducing a number of skilfully chosen transverse segments to gradually transform the refractive index profile from that of the first section to that of the second section (cf. FIG. 6 and discussion below).

Besides helping in reducing the transition loss, the transverse segments also aides the flow of the cladding glass in the fabrication, thus preventing the formation of keyholes between the two narrow arms in section two. These aspects are further described in our co-pending international patent application no. PCT/DK03/00367 with the title "An optical component and a method of fabricating an optical component", which is incorporated herein by reference.

FIG. 5 shows details of the connection of the first 10 and second 20 sections of an embodiment of a spot size converter according to the invention. FIG. 5 illustrates the variable widths of the waveguide core elements ($w_1(z)$ for the first optical waveguide element of section one and $w_{2,1}(z)$, $w_{2,2}(z)$ for the two cooperating optical waveguide elements 21, 22 of the second section) and edge to edge distance $s_{2,1,2}(z)$ between adjacent cooperating optical waveguide elements 21, 22 of the second section in the direction of light propagation 'z' of the optical waveguide elements. The gap $s_{2,1,2}(z)$ between the two optical waveguide elements in section two gives rise to transition loss when crossing the interface 1020 from section one to section two.

Figure 6:
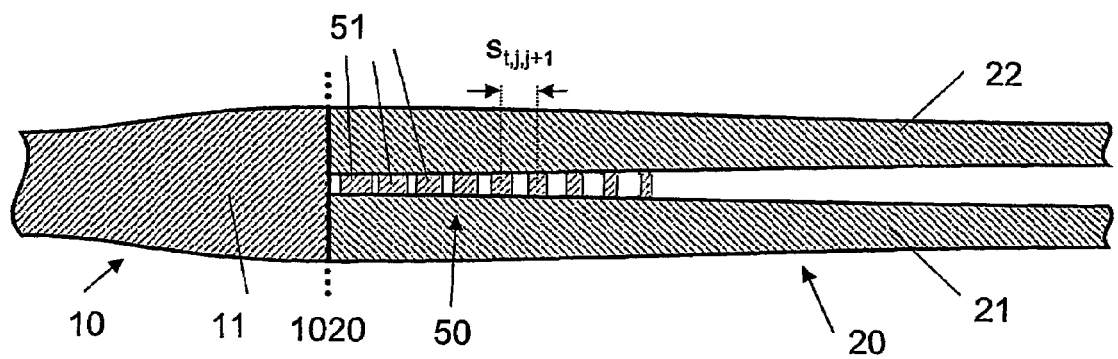
FIG. 6 shows details of the connection of the first and second sections of an embodiment of a spot size converter according to the invention with transversal waveguide core elements between the cooperating optical waveguide elements of the second section.

FIG. 6 shows details of the connection of the first 10 and second 11 sections of an embodiment of a spot size converter according to the invention with transversal waveguide core elements 50 between the cooperating optical waveguide elements 21, 22 of the second section.

FIG. 6 illustrates the introduction of skilfully chosen transverse core segments 51 between the cooperating waveguides of the second section of the optical component whereby the refractive index profile can be gradually transformed from that of the first section 10 to that of the second section 20, hence reducing the transition loss. The transversal elements further have the advantageous effect of facilitating the flow of the cladding glass during fabrication, thereby minimizing or preventing the formation of keyholes. In the embodiment shown in FIG. 6, the widths $w_{t,j}$ of the transversal elements 51 decrease with increasing j, i.e. with increasing distance from the interface 1020 between section one and section two. In the embodiment shown in FIG. 6, the centre to centre distance $s_{t,j,j+1}$ between transversal elements 51 is essentially constant. In a preferred embodiment of the invention, the centre to centre distance $s_{t,j,j+1}$ is increasing with increasing j.

Figure 7:
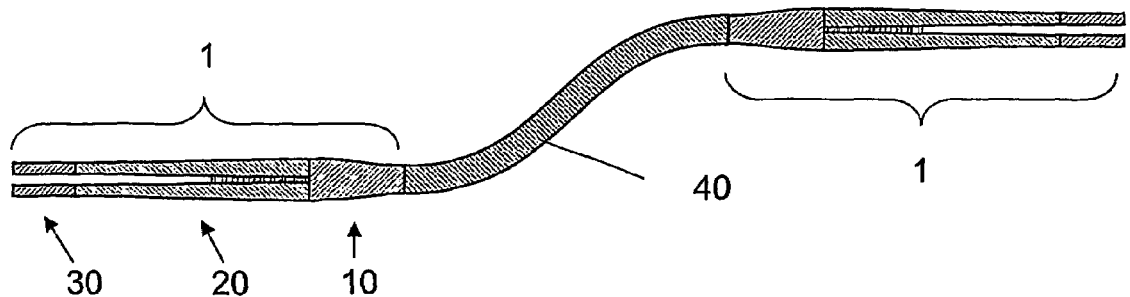
FIG. 7 shows a configuration of two spot size converters according to the invention connected by a waveguide.

FIG. 7 shows a configuration of two spot size converters 1 according to the invention connected by a bended waveguide 40. Measuring insertion loss for this structure gives two times the coupling loss plus the propagation loss for the structure. The bend is included in order to ensure that only a minimum of stray light from the in-coupling reaches the output. The individual parts are not drawn to scale. The section in-between the mode-couplers could be any waveguide functionality.

According to the invention a number of spot size converters were fabricated connected to bended waveguides as depicted in FIG. 7.

Typical structure parameters for a spot size converter fabricated in silica-on-silicon technology according to the invention are (@ $\Delta n/n=2.5\%$):

| | | |
|---|---|---|
| L Structure | 2500 μm | |
| $L_{Taper,1}$ | 500 μm | |
| $W_{Taper,1}$ | 4.0 μm | |
| $S_{Gap}$ | 0.6 μm, | |
| | 0.7 μm, | |
| | 0.8 μm. | |
| $L_{Taper,2}$ | 1700 μm | |
| $W_{End}$ | 0.7 μm, | |
| | 0.8 μm, | |
| | 0.9 μm | |
| $S_{Separation}$ | 3.0 μm | |
| $L_{Dice}$ | 300 μm | |

The results obtained using SMF-28 type of input and output fibre, as well as typical geometries for low-index structures are given in the table below. All results be it measured or calculated are for a wavelength of 1550 nm.

| Geometry | Index Difference | Mode Field Diameter | Calculated loss per facet | Measured loss per facet |
|---|---|---|---|---|
| 6.0 × 6.0 μm² Without SSC | 0.62% | 7.82 μm | 0.28 dB | N/A |
| 6.0 × 6.0 μm² | 0.75% | 7.30 μm | 0.44 dB | N/A |
| Without SSC 3.0 × 3.0 μm² | 2.50% | 3.92 μm | 3.08 dB | 3.25 dB |
| Without SSC 3.0 × 3.0 μm² SSC excl. Segments | 2.50% | 3.92 μm | 0.39-0.59 dB | 0.40-0.50 dB |
| 3.0 × 3.0 μm² SSC incl. Segments | 2.50% | 3.92 μm | 0.27-0.35 dB | 0.25-0.35 dB |

From the table it appears that a spot size converter according to the invention lowers the loss of the high index difference waveguides (3.0×3.0 μm² geometry with 2.50% index difference) from 3.25 dB to 0.25-0.35 dB. This is comparable to a standard index situation (6.0×6.0 μm² geometry with 0.75% index difference). The solution with segments reduces the coupling loss to even lower values comparable to the standard index situation with 6.0×6.0 μm² geometry and 0.62% index difference.

FIG. 8 shows various embodiments of spot size converters according to the invention comprising a first and second section. All examples illustrate a first optical waveguide element 11 of the first section and two cooperating optical waveguide elements 21, 22 of the second section, the first and second sections being optically coupled at the interface 1020 (here by the corresponding waveguide elements of the two sections being in physical contact; alternatively, the corresponding waveguide elements may e.g. be separated by a gap). The end 13 of the first optical waveguide element distal to the interface 1020 to the second section is adapted for being coupled to an 'input' waveguide (e.g. a planar waveguide or an optical fibre). The ends 24 of the cooperating waveguides of the second section distal to the interface 1020 to the first section are adapted for being coupled to an 'output' waveguide (e.g. a planar waveguide or an optical fibre) or to a third section comprising dicing waveguides (cf. e.g. 31, 32 in FIG. 3).

FIG. 8.*a* shows an embodiment of the invention, where the widths of the first optical waveguide element 11 and cooperating optical waveguide elements 21, 22 are constant (no tapering) and where the cooperating optical waveguide elements are parallel and of equal width and partly overlapping but not fully aligned with the first optical waveguide element and have a mutual edge to edge distance $S_{Gap}$ (cf. FIG. 4.*b*) at the interface 1020.

FIG. 8.*b* shows an embodiment of the invention, where the widths of the first optical waveguide element 11 and cooperating optical waveguide elements 21, 22 are constant (no tapering) and where the cooperating optical waveguide elements are parallel and of equal width and fully aligned with the first optical waveguide element and have a mutual edge to edge distance $S_{Gap}$ (cf. FIG. 4.*b*) at the interface 1020.

FIG. 8.*c* shows an embodiment of the invention, where the width of the first optical waveguide element 11 increases linearly from the input end 13 to the interface 1020 to the second section and where the widths of the cooperating optical waveguide elements 21, 22 are constant (no tapering) and where the cooperating optical waveguide elements are parallel and of equal width and fully aligned with the first optical waveguide element and have a mutual edge to edge distance $S_{Gap}$ (cf. FIG. 4.*b*) at the interface 1020.

FIG. 8.*d* shows an embodiment of the invention, where the width of the first optical waveguide element 11 increases non-linearly (e.g. according to a cosine or polynomial function, e.g. a $5^{th}$ or $7^{th}$ order polynomial function) from the input end 13 to the interface 1020 to the second section and where the widths of the cooperating optical waveguide elements 21, 22 are constant (no tapering) and where the cooperating optical waveguide elements are parallel and of equal width and fully aligned with the first optical waveguide element and have a mutual edge to edge distance $S_{Gap}$ (cf. FIG. 4.*b*) at the interface 1020.

FIG. 8.*e* shows an embodiment of the invention, where the first optical waveguide element 11 is identical to the one of FIG. 8.*d*, and where the widths of the cooperating optical waveguide elements 21, 22 decrease from the interface 1020 to the end 24, where the neighbouring edges of the optical waveguide elements diverge and the 'outer' edges are parallel, and the cooperating optical waveguide elements are fully aligned with the first optical waveguide element and have a mutual edge to edge distance $S_{Gap}$ (cf. FIG. 4.*b*) at the interface 1020.

FIG. 8.*f* shows an embodiment of the invention, where the first optical waveguide element 11 is identical to the one of FIG. 8.*d*, and where the widths of the cooperating optical waveguide elements 21, 22 decrease linearly from the interface 1020 to the end 24, and the optical waveguide elements are symmetric about a longitudinal centre line (parallel to 'z' in FIG. 5) and fully aligned with the first optical waveguide element and have a mutual edge to edge distance $S_{Gap}$ (cf. FIG. 4.*b*) at the interface 1020.

FIG. 8.*g* shows an embodiment of the invention, where the first optical waveguide element 11 is identical to the one of FIG. 8.*d*, and where the widths of the cooperating optical waveguide elements 21, 22 decrease linearly from the interface 1020 to the end 24, and the optical waveguide elements are non-symmetric about a longitudinal centre line (parallel to 'z' in FIG. 5) and fully aligned with the first optical waveguide element and have a mutual edge to edge distance $S_{Gap}$ (cf. FIG. 4.*b*) at the interface 1020. The mode field of the cooperating optical waveguide elements at their ends 24 is not centred along the centre line of the first optical waveguide element of the first section; in other words the component is not mirror symmetric about the centre line of the first optical waveguide element of the first section.

FIG. 8.*h* shows a preferred embodiment of the invention, where the first optical waveguide element 11 is identical to the one of FIG. 8.*d*, and where the widths of the cooperating optical waveguide elements 21, 22 decrease non-linearly (e.g. according to a cosine or polynomial function, e.g. a $5^{th}$ or $7^{th}$ order polynomial function) from the interface 1020 to the end 24, and the optical waveguide elements are symmetric about a longitudinal centre line (parallel to 'z' in FIG. 5) and fully aligned with the first optical waveguide element and have a mutual edge to edge distance $S_{Gap}$ (cf. FIG. 4.*b*) at the interface 1020.

In all embodiments shown in FIG. 8, except the one in FIG. 8.*g*, the component is mirror symmetric about a centre line of the first optical waveguide element of the first section. In all embodiments shown in FIG. 8, the first optical waveguide element of the first section is symmetric about a centre line in the intended direction of light propagation of the optical waveguide element (cf. 'z' in FIG. 5). Alternatively, the optical waveguide element may be non-symmetric e.g. by having edges represented by (i.e. following) different geometrical curves (e.g. one linear and another cosine, etc.).

Figure 9:
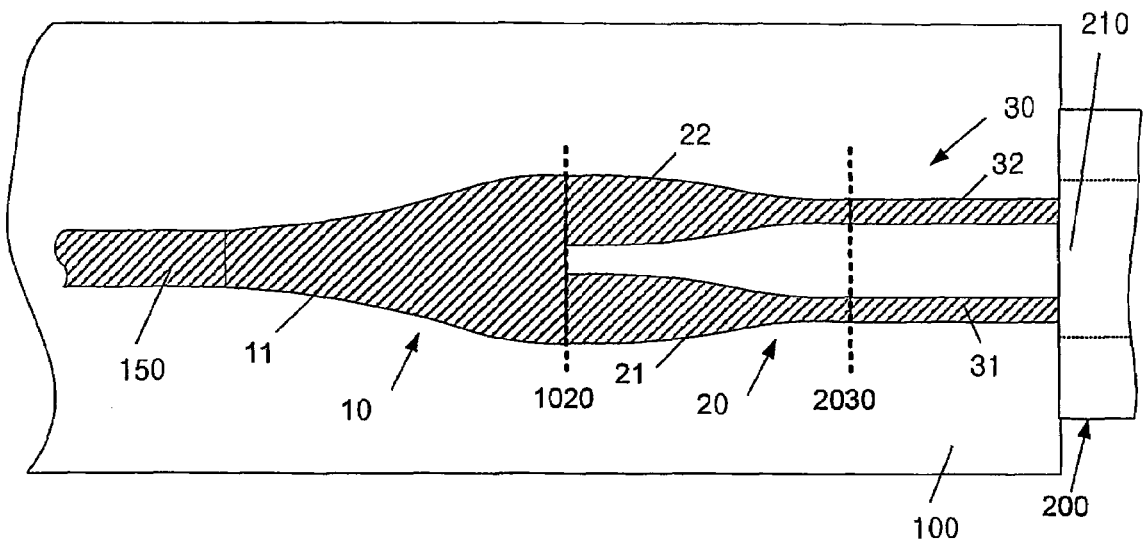
FIG. 9 shows an embodiment of a spot size converter according to the invention coupled to an optical fibre.

FIG. 9 shows an embodiment of a spot size converter according to the invention coupled to an optical fibre 200. The spot size converter forms part of an integrated optical circuit 100, and comprises an input optical planar waveguide 150 integrated with the first optical waveguide element 11 of the first section of the component. The spot size converter comprising first 10, second 20 and third 30 sections is identical to the one shown in FIG. 3. The output facets (cf. 34 in FIG. 4.*c*) of the dicing optical waveguide elements 31, 32 of the third section are polished and aligned with and optically butt coupled to the core region 210 of the optical waveguide, here a single mode fibre 200, e.g. a SMF-28 type fibre.

Figure 10:
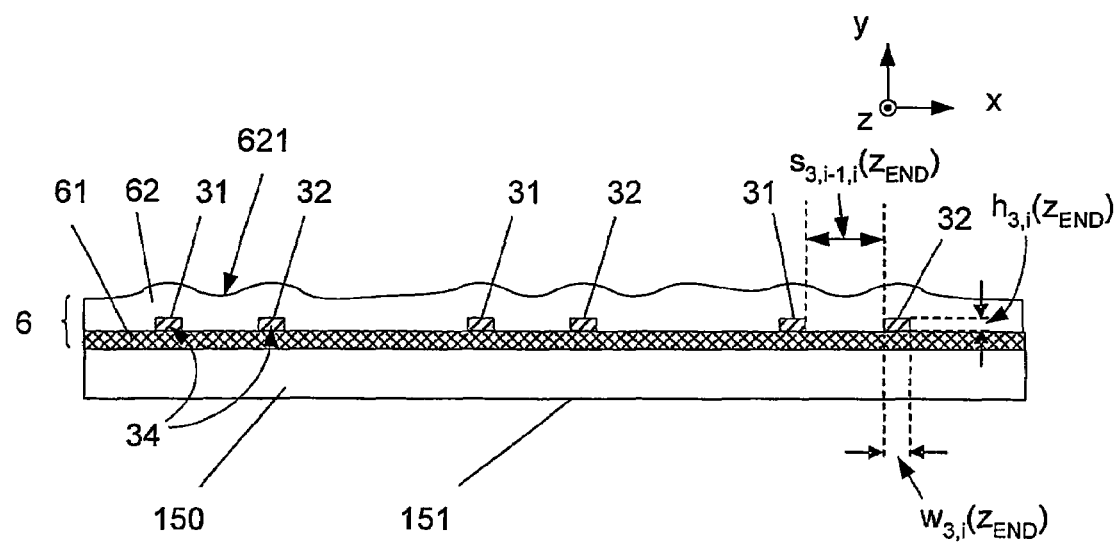
FIG. 10 shows a schematic cross sectional view of an optical component according to the invention comprising a base (or lower cladding) layer formed on a substrate with 2 cooperating waveguide core elements applied to the base layer and covered by an upper cladding layer.

FIG. 10 shows a schematic cross sectional view (x-y-plane) of an optical component according to the invention comprising a base (or lower cladding) layer formed on a substrate with 2 cooperating waveguide core elements applied to the base layer and covered by an upper cladding layer. The cross sectional view is taken at the end of the component which is adapted for being coupled to an 'output' waveguide (e.g. and optical fibre) as indicated by the end facets 34 of the dicing waveguides 31, 32 (cf. also FIG. 4.*c*) and the z-coordinate $z_{END}$ in the waveguide width ($w_{3,i}$), height ($h_{3,i}$) and edge to edge ($s_{3,i-1,i}$) dimensions. The part of the component illustrated in FIG. 10 may thus e.g. be connected to 3 optical fibres (as illustrated in FIG. 9 for one fibre).

In FIG. 10 the cladding layer 6 comprises a lower cladding layer 61 formed on a substrate 150 with 3×2 dicing waveguide core elements 31, 32 applied to the lower cladding layer 61, the waveguide core sections and the parts of the lower cladding layer not being covered by the waveguide core pattern is covered by an upper cladding layer 62. Additionally the upper cladding layer 62 is shown to have a corrugated surface 621 due to repeated deposition and annealing steps leading to reflow of the upper cladding layer. The upper cladding layer has a lower flow temperature than that of the core and lower cladding layers, controlled by proper addition of boron, phosphorus and/or fluorine (or any other dopants that reduces the flow temperature). The control of the cladding reflow properties is e.g. described in R. A. Levy, K. Nassau, "Reflow Mechanisms of Contact Vias in VLSI Processing", J. Electrochem. Soc., Vol. 133, No. 7, p. 1417 (1986), which is incorporated herein by reference.

Fabrication Technology

An optical component according to the present invention can be fabricated in a number of different planar technologies such as in polymers, in Silicon-on-insulator (SOI), Lithiumniobate (LiNbO$_3$), III-V, Silicon-Oxy-Nitride (SiON), as well as in silica-on-Silicon and others. In an embodiment of the present invention the silica-on-silicon planar technology is used as this technology produces the most advanced and technically developed planar waveguide components. Silica waveguides possess a number of highly attractive properties such as material compatibility (optical fibres are made from the same material, silica), optimum coupling between fibre and waveguide component (refractive indices and index differences are comparable), low absorption- and propagation losses, low birefringence, high stability and low cost. Furthermore, the technology used to fabricate these silica waveguides is identical to the technology used in fabricating integrated electrical circuits such as CPU's (Central Processing Units in computers) and e.g.

RAM (Random Access Memory), thus this technology has matured during the last more than thirty years and is known to be capable of mass production.

In an embodiment of the present invention a clean and bare Silicon wafer (used as substrate, step a) is firstly oxidized (step b) to provide an optical isolation layer of silica sufficiently thick that the magnitude of the evanescent field tail of the field pertaining to the waveguide cores is sufficiently low to ensure negligible propagation loss. This first layer of silica is referred to as the buffer layer. On top of the buffer layer a layer of doped-silica is deposited (step c), containing one or more dopants that effectively act to increase the refractive index of said layer. This doped layer of silica glass is referred to as the core layer. Depending upon the method used to deposit the core layer a high temperature treatment (known as an anneal step) may be advantageous in order to stabilize the optical and/or mechanical properties of said layer. The optical waveguide circuitry is defined through standard optical lithography where a UV-transparent plate containing typically a chromium pattern replica of the waveguide design pattern and possible other structural elements (such as stress relieving and transversal elements) (step d) is pressed against a layer of UV-sensitive polymer which has been spin coated onto the surface of the core silica layer, subsequently the UV-sensitive polymer is exposed through the mask and the pattern is developed (step e). Following the exposure and development of the waveguide pattern into the polymer layer, the polymer pattern is used as masking material for dry etching (e.g. RIE—Reactive Ion Etching, ICP—Inductively Coupled Plasma) into the core silica layer (step e). Alternatively a second masking material is sandwiched between the silica core layer and the UV-sensitive polymer layer, which is used to enhance selectivity and waveguide core profile. In this way the design waveguide pattern is transferred into the core silica layer having predetermined cross-sectional properties as well as refractive index. In order to protect the recently defined waveguide core, and in order to enhance symmetry in the structure transverse to the direction of propagation a layer of silica with optical properties as close to those of the buffer layer as the chosen fabrication technology permits is deposited on top of the core structure (step f). The formation of the latter layer (e.g. termed the upper cladding layer) may be formed using successive deposition and annealing steps (step f).

Various relevant aspects of the silica-on-silicon technology is e.g. discussed in M. Kawachi, "Silica waveguide on silicon an their application to integrated-optic components", Opt. Quant. Electr. 22 (1990) 391-416, which is incorporated herein by reference. Various relevant aspects of low loss plasma enhanced chemical vapour deposited planar waveguides are e.g. discussed in Christian Laurent-Lund, "PECVD grown Multiple Core Planar Waveguides with Extremely Low Interface Reflections and Losses", Photon. Technol. Lett. 10 (1998) 1431-1433, which is incorporated herein by reference. Various aspects of the technique of cladding deposition and reflow annealing using boron-phosphorus silica glass (BPSG) are disclosed in U.S. Pat. No. 6,044,192, which is incorporated herein by reference.

Taper Design

Light propagating in a mode of the optical field, pertaining to a waveguide, will experience scattering whenever there is a discontinuity in the waveguide centre/width, the angle of propagation or the radius of curvature of the waveguide. Said scattering is a loss component, and as such should be avoided if possible. Practical waveguide circuits need to have bends, hence introducing the possibility of scattering. Most curves, such as straights, trigonometric curves, exponential curves etc. are predetermined, thus have predetermined radii of curvature at specific points, hence making it very difficult, if not impossible, to connect two such curves without discontinuities in the radius of curvature.

Given an n'th order polynomial (n>=1), a curve can be drawn between any two points of different abscissa values. Determination of the polynomial coefficients are based on restraints (boundary conditions) from which (besides the points themselves) the angles of the tangents at each point, as well as the curvatures may be calculated. Polynomial curves of sufficiently high degree can thus be used to generate waveguides that match an input waveguide in one end, and an output waveguide in the other end, such that there is no discontinuity in the waveguide centre/width, the waveguide angle or the radii of curvature. This is a prerequisite for adiabatic propagation of the field from the input waveguide to the output waveguide.

The general n'th order polynomial is described by $$x(z) = \sum_{i=0}^{n} a_i z^i,$$

where $a_i$ are the polynomial coefficients to be determined for a specific polynomial.

For the polynomial the following holds $$R\ddot{Y}\ddot{Y}\square \text{ through}() \frac{1}{n()}.$$

In order to generate a waveguide (WG_b), described by a polynomial curve, between two other waveguides (WG_a and WG_c), that minimises scattering loss where waveguide WG_b is connected to WG_a and to WG_c, the waveguide curve WG_b must be specified by at least a 5'th order polynomial. If a smoother connection is desired, the polynomial degree can be increased. The penalty for increasing the polynomial degree is that the minimum radius of curvature may decrease for fixed boundary conditions.

The coefficients $a_i$ are determined from the set of equations $$x(z) = \sum_{i=0}^{n} a_i z^i$$

$$x'(z) = \sum_{i=1}^{n} i a_i z^{i-1}$$

$$x''(z) = \sum_{i=2}^{n} i(i-1) a_i z^{i-2}$$

$$x^{(k)}(z) = \sum_{i=k}^{n} \left( \prod_{j=1}^{k} (k-j+1) \right) a_i z^{i-k}$$

Typically, but not necessarily, the value of n is chosen uneven (5, 7 ...) such that the number of coefficients is even (as $a_0$ also is included)—When this is the case one typically (but not necessarily) chooses half of the required n+1 boundary conditions from the first/left point, and the other half from the second/right point; in this case, k in the above equation equals (n−1)/2. For a 5'th order polynomial this could be as described below.

The two points in question ($P_1$ and $P_2$) are described by triples $P_1:(z_1;x_1,x'_1,x''_1)$ $P_2:(z_2;x_2,x'_2,x''_2)$, where $z_1$ ($z_2$) typically is the right (left) endpoint (start point) of the waveguide to the left (right) of the polynomial waveguide. The corresponding values $x_i$, $x'_i$ & $x''_i$ (i=1, 2) are derived from the elevation, angle and radius of curvature of said left and right waveguides. This gives a system of n+1 (here 6) equations having n+1 (here 6) undetermined coefficients, said coefficients can be determined, e.g., using standard matrix algebra.

After determining the coefficients, one is left with a function x(z) that describes a curve between the two points $P_1$ and $P_2$. From this function the radius of curvature can be determined, and one can determine the minimum radius of curvature ($R_{min}$) for the present curve. If the absolute value of $R_{min}$ is smaller than desired, one must alter the specifications for at least one of the two points $P_1$ and $P_2$. Obvious ways to do this is to increase the distance between $P_1$ and $P_2$, or to alter one or both of the angles of the connecting waveguides.

EXAMPLE 1

Figure 11A:
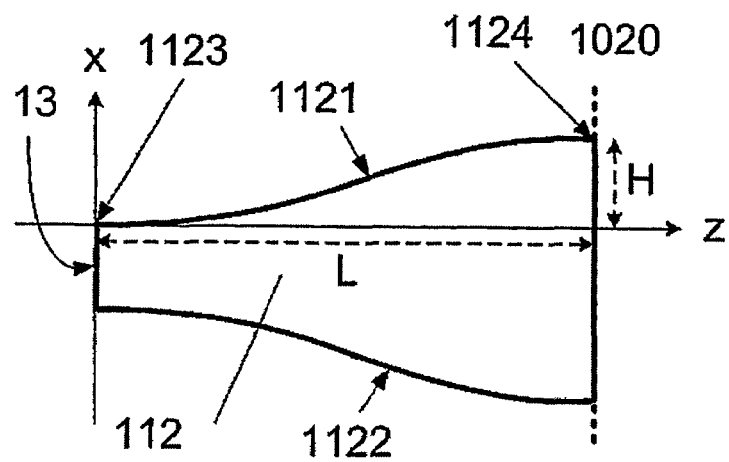
FIG. 11 illustrates the taper design of a waveguide element of the first section of a spot size converter according to the invention.

In the following, an example will be given on how to construct a specific preferred 7'th order curve, e.g. for a first optical waveguide element of a first section of a spot size converter according to the present invention (it may, of course, likewise be used for forming an edge or the edges of the at least two cooperating optical waveguide elements of a second section of the optical component in question). FIG. 11 illustrates the taper design of a waveguide element of the first section of a spot size converter according to the invention. FIG. 11a shows a waveguide element 112 of the first section having edges 1121, 1122 formed as a $7^{th}$ order polynomial. As in FIG. 8, the first optical waveguide element 112 has a first end 13 adapted to be optically connected to an input waveguide and an interface 1020 adapted to be optically connected to the waveguide of the second section of the spot size converter. The upper edge 1121 is represented by a curve having a length L in the z direction and a height H in the x-direction. The first three derivatives at both ends are set to be zero. The full set of boundary conditions being:

$x(0)=x'(0)=x''(0)=x'''(0)=0$ $x(L)=H, x'(L)=x''(L)=x'''(L)=0$ the end points (z, x)=(0, 0) and (z, x)=(L, H) being referred to in FIG. 11 as 1123 and 1124, respectively. Due to the requirement that the first three derivatives at the starting point z=0 must be zero, the coefficients $a_0$-$a_3$ are zero, thus we end up with $$x(z) = a_4 z^4 + a_5 z^5 + a_6 z^6 + a_7 z^7$$

where

-continued $$a_4 = 35\frac{H}{L^4}, a_5 = -84\frac{H}{L^5}, a_6 = 70\frac{H}{L^6}, a_7 = -20\frac{H}{L^7}$$

As an example, let L=2500 µm and H=125 µm, then $a_4 = 1.1200 \cdot 10^{-10}$ $a_5 = -1.0752 \cdot 10^{-13}$ $a_6 = 3.5840 \cdot 10^{-17}$ $a_7 = -4.0960 \cdot 10^{-21}$ This curve has a minimum radius of curvature of approximately 6.7 mm, which is sufficiently large to avoid bend radiation loss for a typical silica on silicon waveguide structure having a cross section of 6×6 µm$^2$ and an index difference of 0.75%.

The curve can be used to generate a simple bend, where the bend has a constant width from start to end. It can, however, also be used to generate a tapered bend, thus creating an adiabatic bended taper, as the curves that describe the upper and lower part of the waveguide both can be suitably chosen 5'th or 7'th order curves.

EXAMPLE 2

In the following an example will be given on how to construct a 7'th order waveguide taper. All considerations regarding the 7'th order taper are valid also for 5'th order tapers.

A taper is a waveguide element that changes width from a start width $W_1$ to an end width $W_2$ over the length L_Taper. A 7'th order waveguide taper is a taper where at least one of the sides of the waveguide is described by a 7'th order polynomial.

Figure 11B:
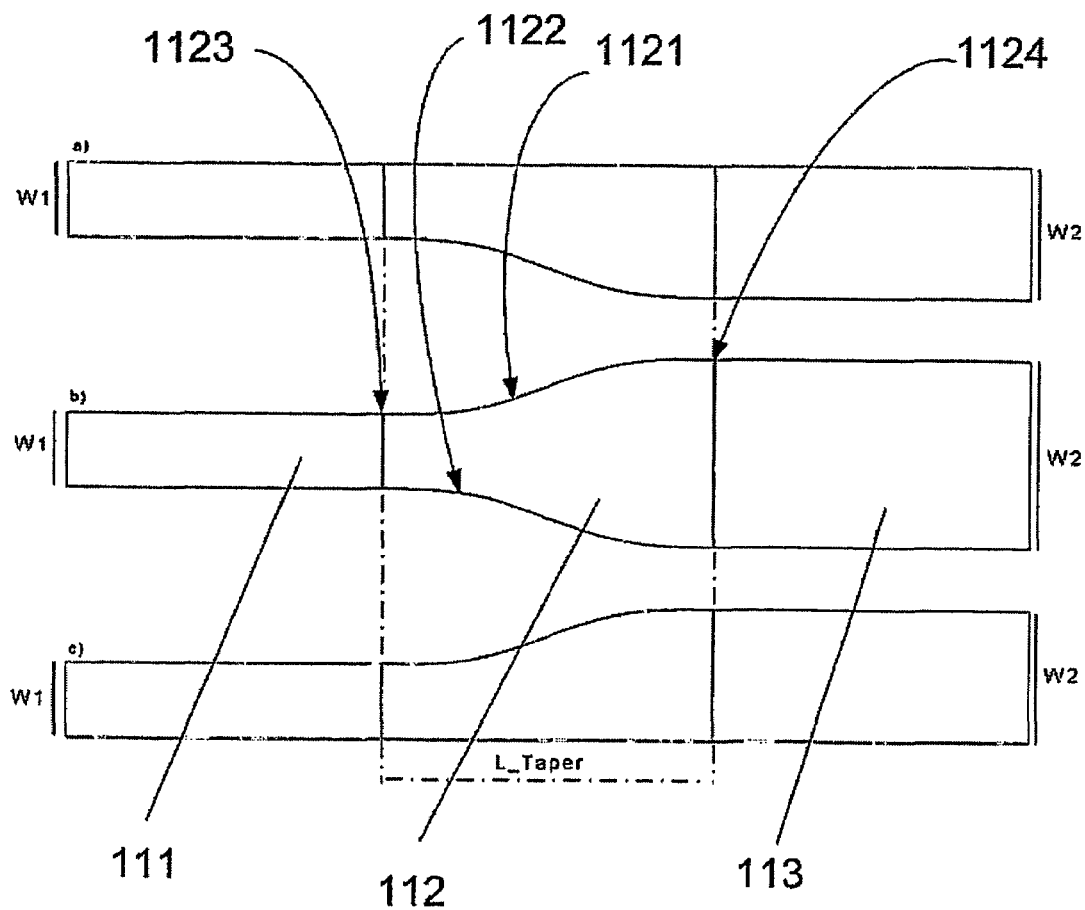

FIG. 11b exhibits three different 7'th order tapers, the upper (a) and lower (c) tapers having one edge linear and the other edge tapered by a 7'th order polynomial (the tapers being each other's mirror image). The middle taper (b) represents a preferred embodiment where both edges 1121, 1122 of the first section 112 of a spot size converter follow a 7'th order polynomial, thereby adiabatically transferring the fundamental mode from one width to another width. Elements 111 and 113 to the left and right of the taper 112 of the middle taper (b) are dummy rectangles, but may be seen as representing waveguides of constant width illustrating the transformation of the waveguide width from $W_1$ (111) to $W_2$ (113) by means of the tapered waveguide 112.

In the following, it is described how to make a taper as the middle taper (b) in FIG. 11b. For this purpose we can use the 7'th order polynomial devised in example 1 above, with the generalised coefficients $a_4$-$a_7$.

The elevation H of the 7'th order curve is $$H = \frac{W_2 - W_1}{2}$$

and the length L of the taper is L_Taper (cf. FIG. 11b).

From H and L, the coefficients $a_4$-$a_7$ can be calculated. The taper in consideration can be described as the area between an upper curve U(z), and a lower curve L(z), where $$U(z) = \frac{W_1}{2} + x(z)$$

$$L(z) = -U(z)$$

where x(z) is given by the formula in Example 1 above.

As an example let $W_1=3$ µm, $W_2=4$ µm, and L_Taper=500 µm. In this case H=0.5 µm and L=500 µm, then $a_4 = 2.8000 \cdot 10^{-10}$ $a_5 = -1.3440 \cdot 10^{-12}$ $a_6 = 2.2400 \cdot 10^{-15}$ $a_7 = -1.2800 \cdot 10^{-18}$ A 7'th order waveguide taper as described above will adiabatically transform the fundamental mode of the first waveguide of width $W_1=3$ µm into the fundamental mode of the second waveguide of width $W_2=4$ µm.

EXAMPLE 3

This example will focus on how to fabricate a specific spot-size converter (as e.g. schematically illustrated in FIG. 3.a or FIG. 8.h). The spot-size converter consists of a taper (termed section 1 above) that transforms the fundamental mode from one width $W_1$ to another width $W_2$, followed by two arms (termed section 2 above) that further propagate and shape the mode such that it as far as possible resembles the mode of an output waveguide typically of different origin (e.g. an optical fibre) as compared to the one of width $W_1$.

For the sake of simplicity said two arms are made from tapered cosines, but may also be made from adiabatic tapered 5'th or 7'th order polynomials (cf. examples 1 and 2 above).

The tapered cosine waveguide is described by the area between an upper curve U(z), and a lower curve L(z), where $$U(z) = x(z) + \frac{W(z)}{2}$$

$$L(z) = x(z) - \frac{W(z)}{2}$$

where x(z) is the centre line, and W(z) is the position dependent width of the waveguide taper $$x(z) = \frac{H}{2}\left(1 - \cos\left\{\pi \frac{z}{L}\right\}\right)$$

$$W(z) = W_1 - (W_1 - W_2)\frac{z}{L}$$

where H is the elevation of the centre of the cosine curve, and L is the length of the curve. $W_1$ is the start width of the tapered cosine, and $W_2$ is the end width of the tapered cosine.

For a waveguide with index 2.5% above the surroundings and a core cross section of 3×3 µm², the taper from example 2 can be used in conjunction with tapered cosine arms of length L=2000 µm, H=0.3 µm, $W_1=1.65$ µm and $W_2=0.8$ µm to produce a spot-size converter that reduces coupling loss between a 3×3 µm² waveguide and a SMF-28 standard fibre from a little more than 3 dB to approximately 0.5 dB.

The invention is defined by the features of the independent claim(s).

Preferred embodiments are defined in the dependent claims. Some preferred embodiments have been shown in the foregoing, but it should be stressed that the invention is not limited to these, but may be embodied in other ways within the subject-matter defined in the following claims. For example, coupling between different waveguide materials, chip-to-chip coupling waveguide-to-laser coupling, etc.

The invention claimed is:

1. An optical component comprising a combination of optical waveguide elements for modifying the spot size of a mode of an electromagnetic field propagated by an optical waveguide element, the optical waveguide elements being formed on a substrate, the optical component comprising a) a first section, comprising a first optical waveguide element configured to sustain at least one mode of the electromagnetic field, b) a second section comprising at least two cooperating optical waveguide elements, each of said at least two cooperating optical waveguide elements comprising at least one waveguide segment, said at least two cooperating optical waveguide elements being optically connected to said first optical waveguide element of said first section; wherein said cooperating optical waveguide elements of said second section are adapted to maintain optical coupling between said optical waveguide elements to ensure that said at least one mode of the electromagnetic field is sustained by said at least two cooperating optical waveguide elements in cooperation, and said first optical waveguide element and said at least two cooperating optical waveguide elements are tapered to increase in width towards their common interconnection wherein the tapering of at least one of the edges of the first optical waveguide element and/or at least one of the edges of the at least two cooperating optical waveguide elements are defined by a generating curve essentially following a trigonometric functional path, or an $n^{th}$ order polynomial path of at least $5^{th}$ order.

2. An optical component as claimed in claim 1 wherein the tapering of said first optical waveguide element of said first section is defined by a generating curve essentially following a cosine path or an $n^{th}$ order polynomial path.

3. An optical component as claimed in claim 1 wherein adjacent of said at least two cooperating optical waveguide elements of said second section have mutual edge to edge core distances $s_{2,i,i+1}$, and wherein said edge to edge core distances $s_{2,i,i+1}$ decrease towards their connection to said first optical waveguide element of said first section.

4. An optical component as claimed in claim 1 wherein the tapering of at least one of said cooperating optical waveguide elements of said second section is defined by a generating curve essentially following a cosine path or an $n^{th}$ order polynomial path.

5. An optical component as claimed in claim 1 wherein the width $w_1$ of said first optical waveguide element of said first section is larger than or equal to the sum of widths $w_{2,i}$ of said cooperating optical waveguide elements of said second section at their mutual connection.

6. An optical component as claimed in claim 1 wherein said at least two cooperating optical waveguide elements of said second section are configured to be optically coupled to an output optical waveguide.

7. An optical component as claimed in claim 6 wherein said output optical waveguide is formed on said substrate.

8. An optical component as claimed in claim 1, the optical component further comprising c) a third section comprising at least two dicing optical waveguide elements having core widths $w_{3,i}$, said at least two dicing optical waveguide elements being optically connected to said at least two cooperating optical waveguide elements of said second section.

9. An optical component as claimed in claim 8 wherein said at least two dicing optical waveguide elements are essentially straight and parallel.

10. An optical component as claimed in claim 9 wherein the widths $w_{3,i}$ of said at least two dicing optical waveguide elements of said third section remain essentially constant.

11. An optical component as claimed in claim 8 wherein the widths $w_{2,i}$ of said at least two cooperating waveguides of said second section essentially equals the widths $w_{3,i}$, where i=1, 2, . . . , of said at least two dicing optical waveguide elements of said third section at their mutual connection.

12. An optical component as claimed in claim 8 wherein said at least two dicing optical waveguide elements of said third section are configured to be optically coupled to an output optical waveguide.

13. An optical component as claimed in claim 12 wherein said output optical waveguide is an optical fibre.

14. An optical component as claimed in claim 1 wherein said first optical waveguide element of said first section is configured to be optically coupled to an input optical waveguide, said input optical waveguide having a width $w_{in}$ which is essentially equal to the width $w_1$ of said first optical waveguide element at their mutual connection.

15. An optical component as claimed in claim 14 wherein said input optical waveguide is formed on said substrate.

16. An optical component as claimed in claim 1 wherein said combination of optical waveguide elements comprises a base layer formed on said substrate, the base layer having a refractive index $n_{base}$, a waveguide defining core pattern of a core material formed on the base layer, the core material having a refractive index $n_{core}$, an upper cladding layer covering the core pattern and the base layer, the upper cladding layer having a refractive index $n_{uclad}$.

17. An optical component as claimed in claim 16 wherein the index contrast between core and cladding and/or core and base layers $(n_{core}-n_{uclad})/n_{core}$, $(n_{core}-n_{base})/n_{core}$, respectively, is larger than 0.5%.

18. An optical component as claimed in claim 1 wherein at least one transversal waveguide core element is arranged between said at least two cooperating optical waveguide elements of said second section.

19. An optical component as claimed in claim 18 wherein a multitude of M transversal waveguide core elements each having a width $w_{t,j}$, where j=1, 2, . . . , M, and forming paths with a mutual centre to centre distance of $s_{t,j,j+1}$, where j=1, 2, . . . , M-1, j=1 corresponding to the transversal element located closest to said first section and j=M corresponding to the transversal element located farthest from said first section.

20. An optical component as claimed in claim 19 wherein said widths $w_{t,j}$ decrease with increasing j and/or said centre to centre distances of $s_{t,j,j+1}$ increase with increasing j.

21. An optical component as claimed in claim 1 wherein said core material comprises a material from the group GaAs, InP, SiON, Silicon, polymers, sol-gel glasses, $LiNbO_3$.

22. An optical component as claimed in claim 16 wherein the optical waveguide elements comprises a base layer formed on the substrate, a waveguide-defining core pattern of a core material formed on the base layer and an upper cladding layer covering the core pattern and the base layer.

23. An optical component as claimed in claim 1 wherein the waveguide elements of the first and second sections each comprises a core region and the core regions of the optical waveguide elements of the second section are implemented in the same physical layer and continue into the core region of the first optical waveguide element of the first section of the optical component.

24. An optical component as claimed in claim 2 wherein said generating curve follows a $5^{th}$ or a $7^{th}$ order polynomial path.

25. An optical component as claimed in claim 4 wherein said generating curve follows a $5^{th}$ or a $7^{th}$ order polynomial path.

26. A method of manufacturing an optical component having a combination of optical waveguide elements for modifying the spot size of a mode of an electromagnetic field propagated by an optical waveguide element, the optical waveguide elements being formed on a substrate, the optical component comprising a first section, comprising a first optical waveguide element configured to sustain at least one mode of the electromagnetic field, and a second section comprising at least two cooperating optical waveguide elements, each of said at least two cooperating optical waveguide elements comprising at least one waveguide segment, said at least two cooperating optical waveguide elements being optically connected to said first optical waveguide element of said first section; wherein said cooperating optical waveguide elements of said second section are adapted to maintain optical coupling between said optical waveguide elements to ensure that said at least one mode of the electromagnetic field is sustained by said at least two cooperating optical waveguide elements in cooperation, and said first optical waveguide element and said at least two cooperating optical waveguide elements are tapered to increase in width towards their common interconnection wherein the tapering of at least one of the edges of the first optical waveguide element and/or at least one of the edges of the at least two cooperating optical waveguide elements are defined by a generating curve essentially following a trigonometric functional path, or an $n^{th}$ order polynomial path of at least $5^{th}$ order, the method comprising the steps of: a) providing a substrate, b) forming a lower cladding layer on the substrate, c) forming a core layer on the lower cladding layer, d) providing a core mask comprising a core region pattern corresponding to the layout of the core regions of optical waveguide elements of the component, e) forming core regions using the core mask, a photolithographic and an etching process, and f) forming an upper cladding layer to cover the core region pattern and the lower cladding layer.

27. A method according to claim 26, the method further comprising the steps of g) cutting the dicing waveguides of the third section of the components h) dicing/polishing the end facets of said dicing waveguides.

28. A method according to claim 26, the method in step d) further comprising the sub-step of d1) providing that the tapering of the core region of said first waveguide element of said first section and/or at least one of said cooperating optical waveguide elements of said second section of said optical component is/are defined by a generating curve essentially following a cosine path or an nth order polynomial path.

29. A method according to claim 26 wherein the substrate is a silicon substrate, the base and cladding layers comprise silica based oxides and the core layer comprises silicon-oxy-nitride.

30. A method as claimed in claim 26 wherein the formation of layers on the substrate is made by plasma enhanced chemical vapour deposition.

31. A method as claimed in claim 28 wherein said generating curve follows a $5^{th}$ or a $7^{th}$ order polynomial path.

32. An optical component comprising a combination of optical waveguide elements for modifying the spot size of a mode of an electromagnetic field propagated by an optical waveguide element, the optical waveguide elements being formed on a substrate, the optical component comprising a) a first section, comprising a first optical waveguide element b) a second section comprising at least two cooperating optical waveguide elements, said at least two cooperating optical waveguide elements being optically connected to said first optical waveguide element of said first section; and said first optical waveguide element and said at least two cooperating optical waveguide elements being tapered to increase in width towards the optical connection between the cooperating optical waveguide elements and the first waveguide element wherein the tapering of at least one of the edges of the first optical waveguide element and/or at least one of the edges of the at least two cooperating optical waveguide elements are defined by a generating curve essentially following a trigonometric functional path, or an $n^{th}$ order polynomial path of at least $5^{th}$ order.

* * * * *